(12) United States Patent
Mozaffari et al.

(10) Patent No.: US 12,041,591 B2
(45) Date of Patent: Jul. 16, 2024

(54) NR AND NB-IoT COEXISTENCE

(71) Applicant: Telefonaktiebolaget LM Ericsson (publ), Stockholm (SE)

(72) Inventors: Mohammad Mozaffari, San Jose, CA (US); Mehrnaz Afshang, San Jose, CA (US); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 17/419,165

(22) PCT Filed: Oct. 30, 2019

(86) PCT No.: PCT/SE2019/051085
§ 371 (c)(1),
(2) Date: Jun. 28, 2021

(87) PCT Pub. No.: WO2020/145859
PCT Pub. Date: Jul. 16, 2020

(65) Prior Publication Data
US 2022/0110120 A1    Apr. 7, 2022

Related U.S. Application Data

(60) Provisional application No. 62/791,353, filed on Jan. 11, 2019.

(51) Int. Cl.
*H04W 72/0453* (2023.01)
*H04L 67/12* (2022.01)

(52) U.S. Cl.
CPC ......... *H04W 72/0453* (2013.01); *H04L 67/12* (2013.01)

(58) Field of Classification Search
CPC .......................... H04W 72/0453; H04L 67/12
See application file for complete search history.

(56) References Cited

U.S. PATENT DOCUMENTS

2018/0098293 A1\*    4/2018    Jiang .................. H04L 27/2617

OTHER PUBLICATIONS

R1-1808046 Ericsson "Coexistence of NB-IoT with NR" 3GPP WG1 #94 Gothenburg Aug. 20-24, 2018 (Year: 2018).\*
PCT International Search Report and Written Opinion mailed Feb. 19, 2020 for International Application No. PCT/SE2019/051085, 12 pages.
Qualcomm Incorporated, 3GPP TSG-RAN WG1 #86, R1-166364, "NR Numerology Scaling and Alignment", Gothenburg, Sweden, Aug. 22-26, 2016, 5 pages.

(Continued)

*Primary Examiner* — Basil Ma
(74) *Attorney, Agent, or Firm* — Sage Patent Group

(57) ABSTRACT

A wireless device (14, 400) or a radio network node (12, 700) is configured to communicate in a wireless communication network (10). The wireless device (14, 400) or radio node in this regard transmits or receives a signal on an Narrowband Internet-of-Things, NB-IoT, carrier (16). The NB-IoT carrier (16) is within a bandwidth of a New Radio, NR, carrier (22), has a frequency center (24) whose position satisfies a requirement on that position relative to a channel raster (26), and has two or more subcarriers which each align in frequency with a respective subcarrier of the NR carrier (22).

19 Claims, 29 Drawing Sheets

(56) References Cited

OTHER PUBLICATIONS

Ericsson, "Coexistence of NB-IoT with NR", 3GPP TSG RAN WG1 Meeting #95, Tdoc R1-1812130, Spokane, USA, Nov. 12-17, 2018, 12 pages.
Ericsson, "Coexistence of NB-IoT with NR", 3GPP TSG-RAN WG1 Meeting #94, Tdoc R1-1808046, Gothenburg, Sweden, Aug. 20-24, 2018, 8 pages.
Ericsson, "NR and NB-IoT Coexistence", 3GPP TSG RAN WG1 Meeting #94bis, Tdoc R1-1810197, Chengdu, China, Oct. 8-12, 2018, 14 pages.
3GPP, Technical Specification Group Radio Access Network, "NR; Base Station (BS) Radio Transmission and Reception (Release 15)", 3GPP TS 38.104 V15.2.0 (Jun. 2018), Valbonne, France, 147 pages.
3GPP, Technical Specification Group Radio Access Network, "NR; User Equipment (UE) Radio Transmission and Reception, Part 1: Range 1 Standalone (Release 15)", 3GPP TS 38.101-1 V15.3.0 (Sep. 2018), Valbonne, France, 186 pages.

\* cited by examiner

| NR Subcarrier index | NR Subcarrier kHz | NR 100khz raster | | NB-IoT Center kHz | Case A NB-IoT subcarrier index | NB-IoT subcarrier kHz |
|---|---|---|---|---|---|---|
| 0 | 15 | 15 | | | | |
| 1 | 45 | | | | | |
| 2 | 75 | | | | | |
| 3 | 105 | | | | | |
| | | 115 | | | | |
| 4 | 135 | | | | 0 | 135 |
| | | | | | 1 | 150 |
| 5 | 165 | | | | 2 | 165 |
| | | | | | 3 | 180 |
| 6 | 195 | | | | 4 | 195 |
| | | | | | 5 | 210 |
| | | 215 | | | | |
| | | | | 217.5 | | |
| 7 | 225 | | | | 6 | 225 |
| | | | | | 7 | 240 |
| 8 | 255 | | | | 8 | 255 |
| | | | | | 9 | 270 |
| 9 | 285 | | | | 10 | 285 |
| | | | | | 11 | 290 |
| 10 | 315 | 315 | | | | |
| 11 | 345 | | | NB-IoT center offset +2.5 to 100kHz raster and +22.5 to NR subcarrier #6 | | |

*FIGURE 18A*

| NR Subcarrier index | NR Subcarrier kHz | NR 100khz raster | NB-IoT Center kHz | Case B NB-IoT subcarrier index | NB-IoT subcarrier kHz |
|---|---|---|---|---|---|
| 0 | 15 | 15 | | | |
| 1 | 45 | | | | |
| 2 | 75 | | | 0 | 75 |
| | | | | 1 | 90 |
| 3 | 105 | | | 2 | 105 |
| | | 115 | | | |
| | | | | 3 | 120 |
| 4 | 135 | | | 4 | 135 |
| | | | | | |
| | | | | 5 | 150 |
| | | | | | |
| | | | 157.5 | | |
| 5 | 165 | | | 6 | 165 |
| | | | | | |
| | | | | 7 | 180 |
| | | | | | |
| 6 | 195 | | | 8 | 195 |
| | | | | | |
| | | | | 9 | 210 |
| | | 215 | | | |
| | | | | | |
| | | | | | |
| 7 | 225 | | | 10 | 225 |
| | | | | | |
| | | | | 11 | 240 |
| | | | | | |
| 8 | 255 | | | | |
| | | | | | |
| | | | | | |
| | | | | | |
| 9 | 285 | | | | |
| | | | | | |
| | | | | | |
| 10 | 315 | 315 | | | |
| | | | NB-IoT center NOT offset +/-2.5 or +/-7.5 to 100kHz raster but offset +22.5 to NR subcarrier #4 | | |
| 11 | 345 | | | | |

FIGURE 18B

| NR Subcarrier index | NR Subcarrier kHz | NR 100khz raster | | NB-IoT Center kHz | Case C NB-IoT subcarrier index | NB-IoT subcarrier kHz |
|---|---|---|---|---|---|---|
| 0 | 15 | 15 | | | | |
| 1 | 45 | | | | | |
| 2 | 75 | | | | | |
| | | | | | | |
| 3 | 105 | | | | | |
| | | 115 | | | | |
| | | | | | | |
| 4 | 135 | | | | | |
| | | | | | 0 | 140 |
| | | | | | | |
| | | | | | 1 | 155 |
| | | | | | | |
| 5 | 165 | | | | | |
| | | | | | 2 | 170 |
| | | | | | | |
| | | | | | 3 | 185 |
| 6 | 195 | | | | | |
| | | | | | 4 | 200 |
| | | | | | | |
| | | 215 | | | 5 | 215 |
| | | | | | | |
| | | | | 222.5 | | |
| 7 | 225 | | | | | |
| | | | | | 6 | 230 |
| | | | | | | |
| | | | | | 7 | 245 |
| 8 | 255 | | | | | |
| | | | | | 8 | 260 |
| | | | | | | |
| | | | | | 9 | 275 |
| 9 | 285 | | | | | |
| | | | | | 10 | 290 |
| | | | | | | |
| 10 | 315 | 315 | | | 11 | 305 |
| | | | | NB-IoT center offset +7.5 to 100kHz raster but not +7.5 or +22.5 to NR subcarrier #6 | | |
| 11 | 345 | | | | | |

FIGURE 18C

NR AND NB-IoT COEXISTENCE

CROSS-REFERENCE TO RELATED APPLICATIONS

This application is a 35 U.S.C. § 371 national stage application for International Application No. PCT/SE2019/051085, entitled "NR AND NB-IOT COEXISTENCE", filed on Oct. 30, 2019, which claims priority to U.S. Provisional Patent Application No. 62/791,353, filed on Jan. 11, 2019, the disclosures and contents of which are hereby incorporated by reference in their entireties.

TECHNICAL FIELD

The present application relates generally to communicating in a wireless communication network, and relates more particularly to transmitting or receiving a signal on a Narrowband Internet-of-Things (NB-IoT) carrier in such a network.

BACKGROUND

Narrowband Internet-of-Things (NB-IoT) networks are being rolled out at a fast pace, and it is foreseen that in the next few years, a massive number of devices will be connected to the networks, addressing a wide spectrum of IoT use cases. According to some reports, by 2023 there will be 3.5 billion wide-area IoT devices connected to cellular IoT networks. Thanks to a design that enables a 10-year battery lifetime of IoT devices, many of the IoT devices will remain in service years after deployment. During the lifetime of these deployed IoT devices, many networks will undergo Long Term Evolution (LTE) to New Radio (NR) migration. A smooth migration without causing service interruption to the deployed IoT devices is extremely important to mobile network operators (MNO). Furthermore, a migration solution that ensures superior radio resource utilization efficiency and superior coexistence performance between NB-IoT and NR is highly desirable.

SUMMARY

According to some embodiments herein, a signal is transmitted or received on a Narrowband Internet-of-Things (NB-IoT) carrier, e.g., with 15 kHz subcarrier spacing. The NB-IoT carrier is notably positioned within a bandwidth of a New Radio (NR) carrier, e.g., with 30 kHz subcarrier spacing. Despite this, some embodiments nonetheless provide for coexistence between the NB-IoT carrier and the NR carrier in a way that, for instance, mitigates interference between the carriers and utilizes radio resources efficiently. Towards this end, then, the NB-IoT carrier according to some embodiments has a frequency center whose position satisfies a requirement on that position relative to a channel raster, e.g., such that the frequency center is offset by +/−2.5 kHz or +/−7.5 kHz from a 100 kHz raster. Moreover, the NB-IoT carrier has two or more subcarriers which each align in frequency with a respective subcarrier of the NR carrier. For example, in some embodiments that maximize subcarrier alignment for an NR carrier with 30 kHz subcarrier spacing, every other one of the NB-IoT carrier's subcarriers aligns in frequency with a respective one of the NR carrier's subcarriers. Subcarrier alignment in these and other embodiments herein advantageously mitigates interference between the carriers. Furthermore, to minimize the number of NR resource blocks used for accommodating the NB-IoT carrier, the NB-IoT carrier's bandwidth in some embodiments overlaps only a single NR resource block.

More particularly, embodiments herein include a method for communicating in a wireless communication network. The method includes transmitting or receiving a signal on an NB-IoT carrier that is within a bandwidth of an NR carrier, that has a frequency center whose position satisfies a requirement on that position relative to a channel raster, and that has two or more subcarriers which each align in frequency with a respective subcarrier of the NR carrier.

In some embodiments, the method further includes generating the signal. In this case, the transmitting or receiving step includes transmitting the generated signal on the NB-IoT carrier. In other embodiments, the transmitting or receiving step includes receiving the signal on the NB-IoT carrier. In this case, the method may further include processing the received signal.

In any event, in some embodiments, at least one-half of the subcarriers of the NB-IoT carrier each align in frequency with a respective subcarrier of the NR carrier. In some embodiments, every other one of the subcarriers of the NB-IoT carrier aligns in frequency with a respective subcarrier of the NR carrier.

In some embodiments, the requirement on the position of the frequency center of the NB-IoT carrier requires that the position of the frequency center of the NB-IoT carrier be offset from the channel raster 26 by +/−2.5 kHz or +/−7.5 kHz.

In some embodiments, the position of the frequency center of the NB-IoT carrier is a position offset by +22.5 kHz from a subcarrier of the NR carrier with a subcarrier index k* defined by $$k^* = \frac{20r-3}{6}, \frac{20r-4}{6}, \frac{20r-5}{6}, \text{ or } \frac{20r-6}{6},$$

for any integer r that produces a subcarrier index k* within the bandwidth of the NR carrier. Or, the position of the frequency center of the NB-IoT carrier is a position offset by +7.5 kHz from a subcarrier of the NR carrier with a subcarrier index k* defined by $$k^* = \frac{20r}{6}, \frac{20r-1}{6}, \frac{20r-2}{6}, \text{ or } \frac{20r-3}{6},$$

for any integer r that produces a subcarrier index k* within the bandwidth of the NR carrier. Here, the subcarrier index k* is an index of a subcarrier of the NR carrier relative to the channel raster.

In other embodiments, the NR carrier has a subcarrier spacing of 30 kHz. If the bandwidth of the NR carrier is equal to 10 MHz, the position of the frequency center of the NB-IoT carrier is a position offset by +22.5 kHz from a subcarrier of the NR carrier with a subcarrier index k* of −114, −104, −94, −54, −44, −34, 6, 16, 26, 66, 76, 86, 126, or 136, or a position offset by +7.5 kHz from a subcarrier of the NR carrier with a subcarrier index k* of −140, −100, −90, −80, −40, −30, −20, 20, 30, 40, 80, 90, 100, or 140. If the bandwidth of the NR carrier is equal to 15 MHz, the position of the frequency center of the NB-IoT carrier is a position offset by +22.5 kHz from a subcarrier of the NR carrier with a subcarrier index k* of −224, −214, . . . , −14, −4, 6, 16, . . . , or 226, or a position offset by +7.5 kHz from a subcarrier of the NR carrier with a subcarrier index k* of −220, −210, . . . , −10, 0, 10, . . . , 210, or 220. If the bandwidth of the NR carrier is equal to 20 MHz, the position of the frequency center of the NB-IoT carrier is a position offset by +22.5 kHz from a subcarrier of the NR carrier with a subcarrier index k* of −304, −294, . . . , −14, −4, 6, 16, . . . , or 296, or a position offset by +7.5 kHz from a subcarrier of the NR carrier with a subcarrier index k* of −300, −290, . . . , −10, 0, 10, . . . , 290, or 300. If the bandwidth of the NR carrier is equal to 25 MHz, the position of the frequency center of the NB-IoT carrier is a position offset by +22.5 kHz from a subcarrier of the NR carrier with a subcarrier index k* of −384, −374, . . . , −14, −4, 6, 16, . . . , or 386, or a position offset by +7.5 kHz from a subcarrier of the NR carrier with a subcarrier index k* of −390, −380, . . . , −10, 0, 10, . . . , 370, or 380. If the bandwidth of the NR carrier is equal to 30 MHz, the position of the frequency center of the NB-IoT carrier is a position offset by +22.5 kHz from a subcarrier of the NR carrier with a subcarrier index k* of −464, −454, . . . , −14, −4, 6, 16, . . . , or 466, or a position offset by +7.5 kHz from a subcarrier of the NR carrier with a subcarrier index k* of −460, −450, . . . , −10, 0, 10, . . . , 450, or 460.

In some embodiments, the bandwidth of the NB-IoT carrier overlaps only a single NR resource block.

In other embodiments, the NR carrier has a subcarrier spacing of 30 kHz. If the bandwidth of the NR carrier is equal to 10 MHz, the position of the frequency center of the NB-IoT carrier is a position offset by +22.5 kHz from a subcarrier of the NR carrier with a subcarrier index k* of −114, −104, −94, −54, −44, −34, 6, 16, 26, 66, 76, 86, 126, or 136, or a position offset by +7.5 kHz from a subcarrier of the NR carrier with a subcarrier index k* of −140, −100, −90, −80, −40, −30, −20, 20, 30, 40, 80, 90, 100, or 140. If the bandwidth of the NR carrier is equal to 15 MHz, the position of the frequency center of the NB-IoT carrier is a position offset by +22.5 kHz from a subcarrier of the NR carrier with a subcarrier index k* of −224, −214, −174, −164, −154, −114, −104, −94, −54, −44, −34, 6, 16, 26, 66, 76, 86, 126, 136, 146, 186, 196, or 206, or a position offset by +7.5 kHz from a subcarrier of the NR carrier with a subcarrier index k* of −220, −210, −200, −160, −150, −140, −100, −90, −80, −40, −30, −20, 20, 30, 40, 80, 90, 100, 140, 150, 160, 200, 210, or 220. If the bandwidth of the NR carrier is equal to 20 MHz, the position of the frequency center of the NB-IoT carrier is a position offset by +22.5 kHz from a subcarrier of the NR carrier with a subcarrier index k* of −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, or 296, or a position offset by +7.5 kHz from a subcarrier of the NR carrier with a subcarrier index k* of −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, or 300. If the bandwidth of the NR carrier is equal to 25 MHz, the position of the frequency center of the NB-IoT carrier is a position offset by +22.5 kHz from a subcarrier of the NR carrier with a subcarrier index k* of −384, −374, −364, −324, −314, −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296, 336, 346, or 356, or a position offset by +7.5 kHz from a subcarrier of the NR carrier with a subcarrier index k* of −370, −360, −350, −310, −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300, 310, 350, 360, or 370. If the bandwidth of the NR carrier is equal to 30 MHz, the position of the frequency center of the NB-IoT carrier is a position offset by +22.5 kHz from a subcarrier of the NR carrier with a subcarrier index k* of −464, −454, −414, −404, −394, −354, −344, −334, −294, −284, −274, −234, −224, −214, −174, −164, −154, −114, −104, −94, −54, −44, −34, 6, 16, 26, 66, 76, 86, 126, 136, 146, 186, 196, 206, 246, 256, 266, 306, 316, 326, 366, 376, 386, 426, 436, or 446, or a position offset by +7.5 kHz from a subcarrier of the NR carrier with a subcarrier index k* of −460, −450, −440, −400, −390, −380, −340, −330, −320, −280, −270, −260, −220, −210, −200, −160, −150, −140, −100, −90, −80, −40, −30, −20, 20, 30, 40, 80, 90, 100, 140, 150, 160, 200, 210, 220, 260, 270, 280, 320, 330, 340, 380, 390, 400, 440, 450, or 460.

In some embodiments, the NB-IoT carrier has a 67.5 kHz guard band on each side of the NB-IoT carrier within a single NR resource block.

In other embodiments, the NR carrier has a subcarrier spacing of 30 kHz. If the bandwidth of the NR carrier is equal to 10 MHz, the position of the frequency center of the NB-IoT carrier is a position offset by +22.5 kHz from a subcarrier of the NR carrier with a subcarrier index k* of −104, −44, 16, 76, or 136, or a position offset by +7.5 kHz from a subcarrier of the NR carrier with a subcarrier index k* of −90, −30, 30, or 90. If the bandwidth of the NR carrier is equal to 15 MHz, the position of the frequency center of the NB-IoT carrier is a position offset by +22.5 kHz from a subcarrier of the NR carrier with a subcarrier index k* of −224, −164, −104, −44, 16, 76, 136, or 196, or a position offset by +7.5 kHz from a subcarrier of the NR carrier with a subcarrier index k* of −210, −150, −90, −30, 30, 90, 150, or 210. If the bandwidth of the NR carrier is equal to 20 MHz, the position of the frequency center of the NB-IoT carrier is a position offset by +22.5 kHz from a subcarrier of the NR carrier with a subcarrier index k* of −254, −194, −134, −74, −14, 46, 106, 166, 226, or 286, or a position offset by +7.5 kHz from a subcarrier of the NR carrier with a subcarrier index k* of −300, −240, −180, −120, −60, −50, 0, 60, 120, 180, 240, or 300. If the bandwidth of the NR carrier is equal to 25 MHz, the position of the frequency center of the NB-IoT carrier is a position offset by +22.5 kHz from a subcarrier of the NR carrier with a subcarrier index k* of −374, −314, −254, −194, −134, −74, −14, 46, 106, 166, 226, 286, or 346, or a position offset by +7.5 kHz from a subcarrier of the NR carrier with a subcarrier index k* of −360, −300, −240, −180, −120, −60, 0, 60, 120, 180, 240, 300, or 360. If the bandwidth of the NR carrier is equal to 30 MHz, the position of the frequency center of the NB-IoT carrier is a position offset by +22.5 kHz from a subcarrier of the NR carrier with a subcarrier index k* of −464, −404, −344, −284, −224, −164, −104, −44, 16, 76, 136, 196, 256, 316, 376, or 436, or a position offset by +7.5 kHz from a subcarrier of the NR carrier with a subcarrier index k* of −450, −390, −330, −270, −210, −150, −90, −30, 30, 90, 150, 210, 270, 330, 390, or 450.

Embodiments herein further include corresponding apparatus, computer programs, and non-transitory computer-readable mediums for performing the method above. For example, embodiments herein include a wireless device for communicating in a wireless communication network. The wireless device is configured (e.g., via communication circuitry and processing circuitry) to transmit or receive a signal on a Narrowband Internet-of-Things (NB-IoT) carrier that is within a bandwidth of a New Radio (NR) carrier, that has a frequency center whose position satisfies a requirement on that position relative to a channel raster, and that has two or more subcarriers which each align in frequency with a respective subcarrier of the NR carrier.

Embodiments also include a radio network node for communicating in a wireless communication network. The radio network node is configured (e.g., via communication circuitry and processing circuitry) to transmit or receive a signal on a Narrowband Internet-of-Things (NB-IoT) carrier that is within a bandwidth of a New Radio (NR) carrier, that has a frequency center whose position satisfies a requirement on that position relative to a channel raster, and that has two or more subcarriers which each align in frequency with a respective subcarrier of the NR carrier.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 18A-C shows different possible cases for placement of an NB-IoT carrier.

DETAILED DESCRIPTION

Figure 1:
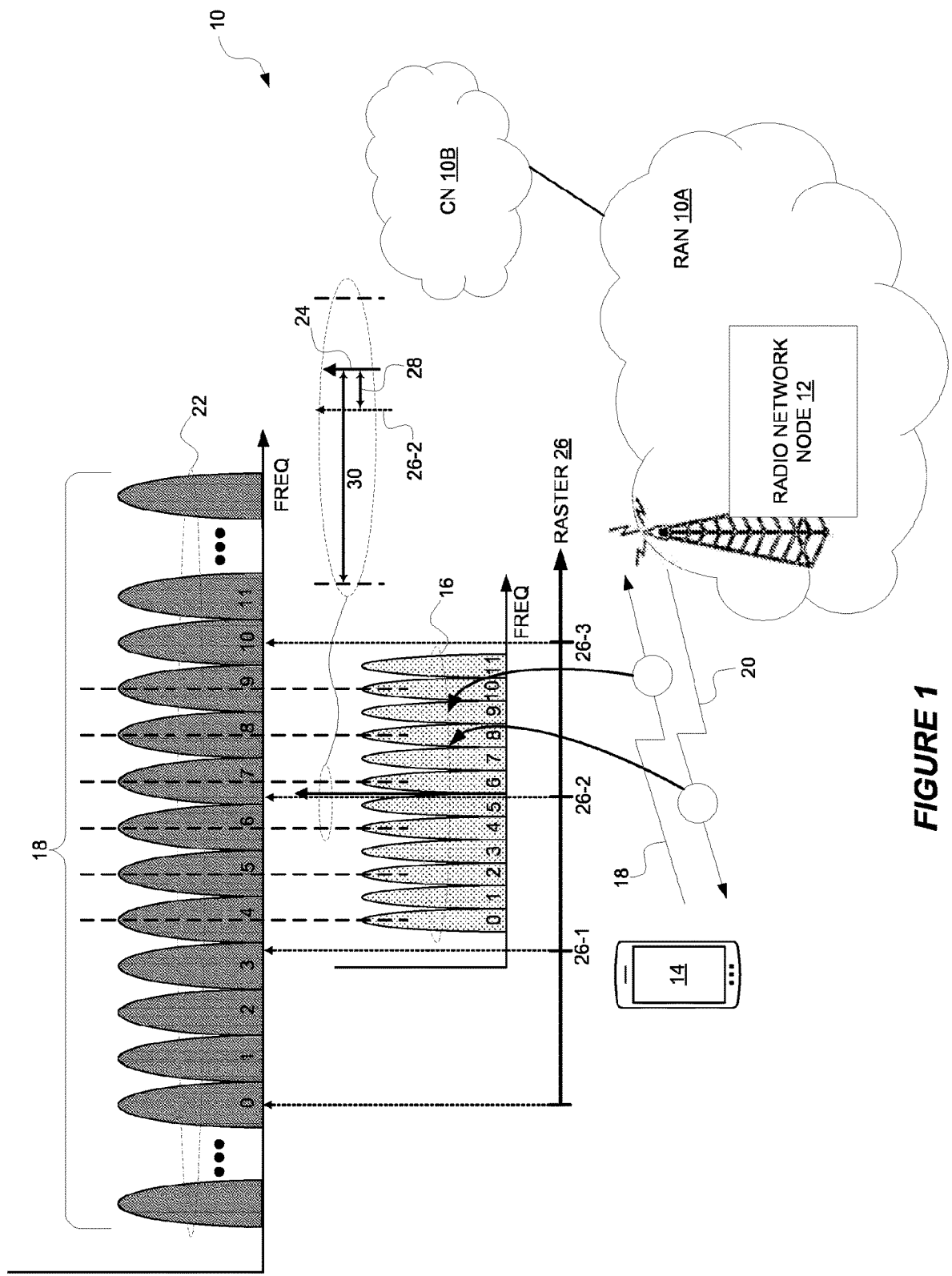
FIG. 1 is block diagram of a wireless communication network according to some embodiments.

FIG. 1 shows a wireless communication network 10 according to some embodiments. The wireless communication network 10 includes a radio access network (RAN) 10A and a core network (CN) 10B. The RAN 10A as shown includes a radio network node 12 that provide radio access for a wireless device 14. The RAN 10A in doing so interconnects the wireless device 14 to the CN 10B, which may provide connection to one or more data networks (not shown), such as the Internet.

The radio network node 12 and the wireless device 14 communicate using one or more Narrowband Internet-of-Things (NB-IoT) carriers, one of which is shown as NB-IoT carrier 16. In the case that NB-IoT carrier 16 is used for uplink communication, the wireless device 14 generates an uplink signal 18 and transmits that signal 18 on the NB-IoT carrier 16 for reception by the radio network node 12. In the case that NB-IoT carrier 16 is alternatively or additionally used for downlink communication, the radio network node 12 generates a downlink signal 20 and transmits that signal 20 on the NB-IoT carrier 16 for reception by the wireless device 14.

The NB-IoT carrier 16 as shown is deployed within the bandwidth 18 of a New Radio (NR) carrier 22. The frequency range occupied by the NB-IoT carrier 16 may for instance partially or fully overlap with the frequency range occupied by the NR carrier 22. The NB-IoT carrier 16 in this regard may be deployed in-band of the NR carrier 22 or within a guard band of the NR carrier 22. Some embodiments herein effectively deploy the NB-IoT carrier 16 in coexistence with the NR carrier 22 in this way while reducing interference between the carriers 16, 22 and/or enhancing resource efficiency.

Specifically, the frequency center 24 of the NB-IoT carrier 16 is the center of the NB-IoT carrier 16 in the frequency domain. Some embodiments herein deploy the NB-IoT carrier 16 so that a position of the frequency center 24 of the NB-IoT carrier satisfies a requirement on that position relative to a channel raster 26 (also referred to as a raster grid). The channel raster 26 defines a subset of reference frequencies that can be used to identify channel positions. The granularity of the channel raster 26 may, for example, be 100 kHz such that the subset of reference frequencies includes frequencies every 100 khz. In any event, imposing a requirement on the position of the NB-IoT carrier's frequency center 24 may reasonably limit the possible positions of the NB-IoT carrier 16, e.g., in order to facilitate the carrier search process. In fact, in some embodiments, the NB-IoT carrier 16 is a so-called anchor carrier on which initial access signals/channels are broadcast, e.g., a Narrowband Primary Synchronization Signal (NPSS), a Narrowband Secondary Synchronization Signal (NSSS), and/or a Narrowband Physical Broadcast Channel (NPBCH). Requiring that the NB-IoT carrier frequency center have a certain position relative to the channel raster 26 may facilitate a search for the NPSS, NSSS, and/or NPBCH.

FIG. 1 for example shows the channel raster 26 as comprising a pattern or grid of frequencies 26-1, 26-2, 26-3, and so on. These frequencies 26-1, 26-2, 26-3, etc. may be separated from one another by a fixed frequency distance, e.g., 100 kHz in the case of a 100 kHz raster grid. Some embodiments comply with a requirement that the NB-IoT carrier's frequency center 24 must be aligned as close as possible with one of the frequencies 26-1, 26-2, 26-3, etc. of the channel raster 26. In some embodiments, for instance, exact alignment of the frequency center 24 with the channel raster 26 is not possible, but it is required that the NB-IoT carrier's frequency center 24 be offset from the channel raster 26 by no more than a maximum allowable offset. FIG. 1 in this regard shows that the NB-IoT carrier's frequency center 24 is deployed with an offset 28 from frequency 26-2 of the channel raster 26, where this offset 28 is no more than the maximum allowable offset. In one specific example for 15 kHz subcarrier spacing, the NB-IoT carrier's frequency center 24 can be offset from the channel raster 26 by +/−2.5 kHz or +/−7.5 kHz, i.e., the offset 28 can be +/−2.5 kHz or +/−7.5 kHz. Where the channel raster 26 is a 100 kHz grid, then, the NB-IoT carrier's frequency center 24 can be placed at either:

$$100n \pm 2.5 \text{ kHz} \tag{1}$$

$$100n \pm 7.5 \text{ kHz} \tag{2}$$

where n is an integer.

FIG. 1 further depicts the NB-IoT carrier 16 as comprising a plurality of subcarriers, shown here for example as being indexed from 0 to 11 and referred to hereinafter as subcarriers 16-0, 16-1, . . . 16-11 of the NB-IoT carrier 16. In this case, the signal 18 or 20 transmitted on the NB-IoT carrier 16 may comprise the combination of multiple, narrowband signals that are frequency multiplexed and jointly transmitted in parallel on respective subcarriers 16-0, 16-1 . . . 16-11 of the NB-IoT carrier 16. The subcarriers 16-0, 16-1, . . . 16-11 in some embodiments may be tightly packed in frequency, with a spacing between the subcarriers that makes the subcarriers mutually orthogonal to one another. The subcarrier spacing for the NB-IoT carrier 16 may for instance be 15 kHz. The subcarriers may be Orthogonal Frequency Division Multiplexing (OFDM) subcarriers or Single Carrier Frequency Division Multiple Access (SC-FDMA) subcarriers. Regardless, the frequency center 24 of the NB-IoT carrier 16 may have a position in between two adjacent subcarriers 16-5 and 16-6 of the NB-IoT carrier 16. Similarly, the NR carrier 22 is shown a comprising a plurality of subcarriers, e.g., with a subcarrier spacing of 30 kHz or 60 kHz. Regardless, FIG. 1 indexes a portion of those subcarriers (e.g., those included in a certain physical resource block, PRB) from 0 to 11, with those subcarriers being referred to hereinafter as subcarriers 22-0, 22-1, . . . 22-11 of the NR carrier 22.

In this context, in addition to deploying the NB-IoT carrier 16 to align as closely as possible with the channel raster 26, some embodiments herein also notably align at least some of the subcarriers 16-0, 16-1, . . . 16-11 of the NB-IoT carrier 16 with at least some of the subcarriers 22-0, 22-1, . . . 22-11 of the NR carrier 22. For example, in some embodiments, two or more of the subcarriers 16-1, 16-1, . . . 16-11 of the NB-IoT carrier 16 each align in frequency with a respective subcarrier 22-0, 22-1, . . . 22-11 of the NR carrier 22. As shown, for instance, at least one-half of the subcarriers 16-0, 16-1, . . . 16-11 of the NB-IoT carrier 16 each align in frequency with a respective subcarrier 22-0, 22-1, . . . 22-11 of the NR carrier 22. Indeed, FIG. 1 shows that subcarrier 16-0 of the NB-IoT carrier 16 aligns in frequency with subcarrier 22-4 of the NR carrier 22, subcarrier 16-2 of the NB-IoT carrier 16 aligns in frequency with subcarrier 22-5 of the NR carrier 22, subcarrier 16-4 of the NB-IoT carrier 16 aligns in frequency with subcarrier 22-6 of the NR carrier 22, subcarrier 16-6 of the NB-IoT carrier 16 aligns in frequency with subcarrier 22-7 of the NR carrier 22, subcarrier 16-8 of the NB-IoT carrier 16 aligns in frequency with subcarrier 22-8 of the NR carrier 22, and subcarrier 16-10 of the NB-IoT carrier 16 aligns in frequency with subcarrier 22-9 of the NR carrier 22. That is, every other one of the subcarriers 16-0, 16-1, . . . 16-11 of the NB-IoT carrier 16 aligns in frequency with a respective subcarrier of the NR carrier 22.

Aligning at least some of the subcarriers of the NB-IoT carrier 16 with at least some of the subcarriers of the NR carrier 22 advantageously reduces interference between the carriers 16, 22. In fact, in embodiments where at least one-half of the subcarriers 16-0, 16-1, . . . 16-11 of the NB-IoT carrier 16 each align in frequency with a respective subcarrier 22-0, 22-1, . . . 22-11 of the NR carrier 22, e.g., so as to realize maximum possible alignment, interference from the NR carrier 22 on the NB-IoT carrier 16 is eliminated and interference from the NB-IoT carrier 16 on the NR carrier 22 is mitigated.

In any event, the subcarrier alignment between the carriers 16, 22 may be translated into or expressed in terms of allowable positions of the NB-IoT carrier's frequency center. That is, there are certain positions of the NB-IoT carrier's frequency center that effectively align at least some subcarriers of the NB-IoT carrier 16 with at least some subcarriers of the NR carrier 22. And the allowable position of the NB-IoT carrier's frequency center may be defined relative to an NR subcarrier, e.g., in terms of an offset 30 shown in FIG. 1 between the NB-IoT carrier's frequency center 24 and an NR subcarrier.

Figure 2A:
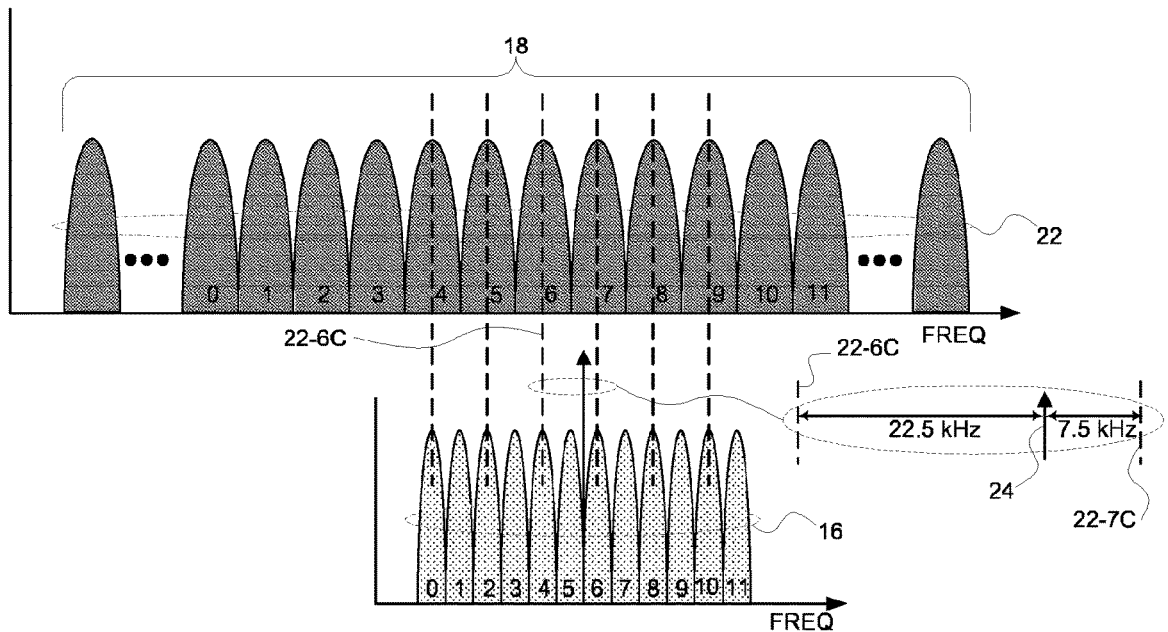
FIG. 2A is a block diagram of subcarrier alignment between an NB-IoT carrier and an NR carrier according to some embodiments.
Figure 2B:
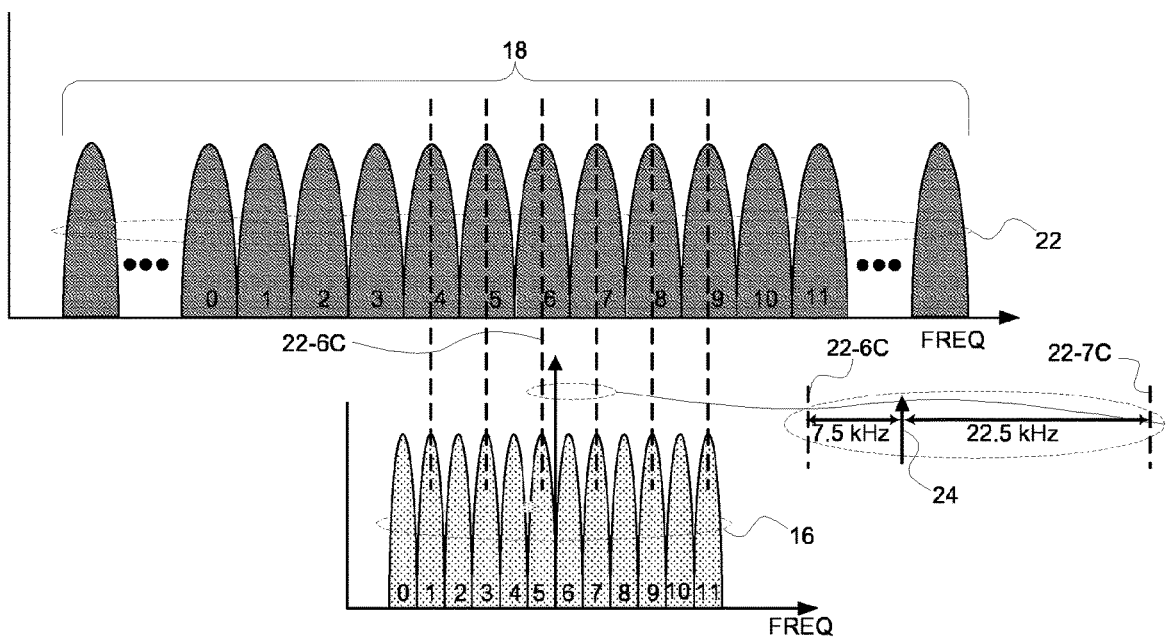
FIG. 2B is a block diagram of subcarrier alignment between an NB-IoT carrier and an NR carrier according to other embodiments.

Consider a specific example where the subcarrier spacing for the NB-IoT carrier 16 is 15 kHz and the subcarrier spacing for the NR carrier 22 is 30 kHz. In this case, maximum subcarrier alignment occurs when one-half of the NB-IoT carrier's subcarriers each align in frequency with a respective subcarrier of the NR carrier 22. With the given subcarrier spacings, this occurs if the NB-IoT carrier's frequency center 24 is positioned either 7.5 kHz or 22.5 kHz after a subcarrier of the NR carrier 22. FIGS. 2A and 2B depict these respective cases. In FIG. 2A, the NB-IoT carrier's frequency center 24 is positioned 22.5 kHz after subcarrier 22-6 of the NR carrier 22. This aligns NB-IoT subcarriers 16-0, 16-2, 16-4, 16-6, 16-8, and 16-10 with NR subcarriers 22-4, 22-5, 22-6, 22-7, 22-8, and 22-9, respectively. In FIG. 2B, by contrast, the NB-IoT carrier's frequency center 24 is positioned only 7.5 kHz after subcarrier 22-6 of the NR carrier 22. This aligns NB-IoT subcarriers 16-1, 16-3, 16-5, 16-7, 16-9, and 16-11 with NR subcarriers 22-4, 22-5, 22-6, 22-7, 22-8, and 22-9, respectively. Generally, though, subcarrier alignment occurs if the NB-IoT carrier's frequency center 24 is positioned at either:

$$100m+30k+22.5 \text{ kHz} \quad (3)$$

$$100m+30k+7.5 \text{ kHz} \quad (4)$$

where m is an integer and k is an index of an NR subcarrier. That is, subcarrier alignment occurs if the NB-IoT carrier's frequency center 24 is placed 7.5 kHz or 22.5 kHz after an NR subcarrier with index k.

According to some embodiments herein, though, the NB-IoT carrier's frequency center 24 is allowed to be placed 7.5 kHz or 22.5 kHz after an NR subcarrier with an index k* such that the position of the NB-IoT carrier's frequency center also satisfies the requirement on that position relative to the channel raster 26. Considering the raster requirement as expressed in equations (1) and (2), then, the index k* of an NR subcarrier must satisfy one of the following equations:

Case 1:

$$100n+2.5=100m+30k+22.5 \quad (5)$$

$$100n-2.5=100m+30k+22.5 \quad (6)$$

$$100n-7.5=100m+30k+22.5 \quad (7)$$

$$100n+7.5=100m+30k+22.5 \quad (8)$$

Case 2:

$$100n+2.5=100m+30k+7.5 \quad (9)$$

$$100n-2.5=100m+30k+7.5 \quad (10)$$

$$100n-7.5=100m+30k+7.5 \quad (11)$$

$$100n+7.5=100m+30k+7.5 \quad (12)$$

In this case, k* is in a set of all integer numbers generated by:

Case 1: (13)
$$\frac{20r-3}{6}, \frac{20r-4}{6}, \frac{20r-5}{6}, \text{ or } \frac{20r-6}{6},$$

Case 2: (14)
$$\frac{20r}{6}, \frac{20r-1}{6}, \frac{20r-2}{6}, \text{ or } \frac{20r-3}{6},$$

where r is an integer. This holds for all integers r that produce a subcarrier index k* within the bandwidth of the NR carrier 22. That is, the allowable positions for the NB-IoT carrier 16 include those positions offset by +22.5 kHz or by +7.5 kHz from any subcarrier of the NR carrier which has an index k* included in the set of integer numbers generated by (13) and (14). For instance, for r=2, using $$\frac{20r-4}{6},$$

the NB-IoT carrier's frequency center can be placed between NR subcarriers k*=6 (relative to the channel raster) and k*+1=7. In this case, the NB-IoT carrier's frequency center can be placed 22.5 kHz after NR subcarrier with index k*=6, as shown in FIGS. 1 and 2A.

Of course, the NR subcarrier indexing in FIG. 1 is just an example. Actual indexing of the subcarriers of the NR carrier 22 and thereby the set of integers generated by (13) and (14) will depend on the bandwidth of the NR carrier 22. For example, if the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−144, −134, . . . , −14, −4, 6, 16, . . . , 136} or includes positions offset by +7.5 kHz from a subcarrier of the NR carrier with a subcarrier index k* included in a subcarrier index set {−140, −130, . . . , −10, 0, 10, . . . , 130, 140}. If the bandwidth of the NR carrier is equal to 15 MHz, the set of positions includes positions offset by +22.5 kHz from a subcarrier of the NR carrier with a subcarrier index k* included in a subcarrier index set {−224, −214, . . . , −14, −4, 6, 16, . . . , 226} or includes positions offset by +7.5 kHz from a subcarrier of the NR carrier with a subcarrier index k* included in a subcarrier index set {−220, −210, . . . , −10, 0, 10, . . . , 210, 220}. If the bandwidth of the NR carrier is equal to 20 MHz, the set of positions includes positions offset by +22.5 kHz from a subcarrier of the NR carrier with a subcarrier index k* included in a subcarrier index set {−304, −294, . . . , −14, −4, 6, 16, . . . , 296} or includes positions offset by +7.5 kHz from a subcarrier of the NR carrier with a subcarrier index k* included in a subcarrier index set {−300, −290, . . . , −10, 0, 10, . . . , 290, 300}. If the bandwidth of the NR carrier is equal to 25 MHz, the set of positions includes positions offset by +22.5 kHz from a subcarrier of the NR carrier with a subcarrier index k* included in a subcarrier index set {−384, −374, . . . , −14, −4, 6, 16, . . . , 386} or includes positions offset by +7.5 kHz from a subcarrier of the NR carrier with a subcarrier index k* included in a subcarrier index set {−390, −380, . . . , −10, 0, 10, . . . , 370, 380}. Or, if the bandwidth of the NR carrier is equal to 30 MHz, the set of positions includes positions offset by +22.5 kHz from a subcarrier of the NR carrier with a subcarrier index k* included in a subcarrier index set {−464, −454, . . . , −14, −4, 6, 16, . . . , 466} or includes positions offset by +7.5 kHz from a subcarrier of the NR carrier with a subcarrier index k* included in a subcarrier index set {−460, −450, . . . , −10, 0, 10, . . . , 450, 460}.

Note further that, in some embodiments, the bandwidth of the NB-IoT carrier 16 overlaps only a single NR resource block. This advantageously minimizes the NR resources which must be reserved for deploying NB-IoT. These and other embodiments may further impact the index k* of the NR subcarrier after which the NB-IoT carrier is placed.

In particular, the NB-IoT carrier 16 may have one of multiple allowable positions. The allowable positions may include a certain set of positions, or a subset thereof. The certain set of positions may include positions offset by +22.5 kHz from a subcarrier of the NR carrier with a subcarrier index k* defined by 12 L+2≤k*≤12 L+7 or by mod (k*, 12)∈{2, 3, 4, 5, 6, 7}, for subcarrier indices k* within the bandwidth of the NR carrier, where $(-N_{RB}/2+1) \leq L \leq N_{RB}/2$, and where $N_{RB}$ is even and is a number of resource blocks included in the bandwidth of the NR carrier. Alternatively or additionally, the certain set of positions may include positions offset by +22.5 kHz from a subcarrier of the NR carrier with a subcarrier index k* defined by 12 L−4≤k*≤12 L+1 or by mod (k*, 12)∈{−4, −3, −2, −1, 0, 1}, for subcarrier indices k* within the bandwidth of the NR carrier, where $-(N_{RB}-1)/2 \leq L \leq (N_{RB}-1)/2$, and where $N_{RB}$ is odd and is a number of resource blocks included in the bandwidth of the NR carrier. Alternatively or additionally, the certain set of positions may include positions offset by +7.5 kHz from a subcarrier of the NR carrier with a subcarrier index k* defined by 12 L+3≤k*≤12 L+8 or by mod (k*, 12)∈{3, 4, 5, 6, 7, 8}, for subcarrier indices k* within the bandwidth of the NR carrier, where $(-N_{RB}/2+1) \le L \le N_{RB}/2$, and where $N_{RB}$ is even and is a number of resource blocks included in the bandwidth of the NR carrier. Alternatively or additionally, the certain set of positions may include positions offset by +7.5 kHz from a subcarrier of the NR carrier with a subcarrier index k* defined by 12 L−3≤k*≤12 L+2 or by mod (k*, 12)∈{−3, −2, −1, 0, 1, 2}, for subcarrier indices k* within the bandwidth of the NR carrier, where $-(N_{RB}-1)/2 \le L \le (N_{RB}-1)/2$, and where $N_{RB}$ is odd and is a number of resource blocks included in the bandwidth of the NR carrier.

Translating this into sets of subcarrier indices, if the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−114, −104, −94, −54, −44, −34, 6, 16, 26, 66, 76, 86, 126, 136} or includes positions offset by +7.5 kHz from a subcarrier of the NR carrier with a subcarrier index k* included in a subcarrier index set {−140, −100, −90, −80, −40, −30, −20, 20, 30, 40, 80, 90, 100, 140}. Alternatively or additionally, if the bandwidth of the NR carrier is equal to 15 MHz, the set of allowable positions for the NB-IoT carrier includes positions offset by +22.5 kHz from a subcarrier of the NR carrier with a subcarrier index k* included in a subcarrier index set {−224, −214, −174, −164, −154, −114, −104, −94, −54, −44, −34, 6, 16, 26, 66, 76, 86, 126, 136, 146, 186, 196, 206} or includes positions offset by +7.5 kHz from a subcarrier of the NR carrier with a subcarrier index k* included in a subcarrier index set {−220, −210, −200, −160, −150, −140, −100, −90, −80, −40, −30, −20, 20, 30, 40, 80, 90, 100, 140, 150, 160, 200, 210, 220}. Alternatively or additionally, if the bandwidth of the NR carrier is equal to 20 MHz, the set of allowable positions for the NB-IoT carrier includes positions offset by +22.5 kHz from a subcarrier of the NR carrier with a subcarrier index k* included in a subcarrier index set {−304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296} or includes positions offset by +7.5 kHz from a subcarrier of the NR carrier with a subcarrier index k* included in a subcarrier index set {−300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300}. Alternatively or additionally, if the bandwidth of the NR carrier is equal to 25 MHz, the set of allowable positions for the NB-IoT carrier includes positions offset by +22.5 kHz from a subcarrier of the NR carrier with a subcarrier index k* included in a subcarrier index set {−384, −374, −364, −324, −314, −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296, 336, 346, 356} or includes positions offset by +7.5 kHz from a subcarrier of the NR carrier with a subcarrier index k* included in a subcarrier index set {−370, −360, −350, −310, −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300, 310, 350, 360, 370}. Alternatively or additionally, if the bandwidth of the NR carrier is equal to 30 MHz, the set of allowable positions for the NB-IoT carrier includes positions offset by +22.5 kHz from a subcarrier of the NR carrier with a subcarrier index k* included in a subcarrier index set {−464, −454, −414, −404, −394, −354, −344, −334, −294, −284, −274, −234, −224, −214, −174, −164, −154, −114, −104, −94, −54, −44, −34, 6, 16, 26, 66, 76, 86, 126, 136, 146, 186, 196, 206, 246, 256, 266, 306, 316, 326, 366, 376, 386, 426, 436, 446} or includes positions offset by +7.5 kHz from a subcarrier of the NR carrier with a subcarrier index k* included in a subcarrier index set {−460, −450, −440, −400, −390, −380, −340, −330, −320, −280, −270, −260, −220, −210, −200, −160, −150, −140, −100, −90, −80, −40, −30, −20, 20, 30, 40, 80, 90, 100, 140, 150, 160, 200, 210, 220, 260, 270, 280, 320, 330, 340, 380, 390, 400, 440, 450, 460}.

Still other embodiments herein additionally position the NB-IoT carrier within a single NR resource block so that the NB-IoT carrier has a meaningfully sized guard band on each side of the NB-IoT carrier. For example, the NB-IoT carrier may be placed close to the middle of the NR resource block, e.g., for maximum guard band. In some embodiments, for instance, the NB-IoT carrier has a guard band of at least 67.5 kHz on each side of the NB-IoT carrier within the single NR resource block.

This further restriction on placement of the NB-IoT carrier for guard band purposes may mean that the set of allowable positions for the NB-IoT carrier is as follows. If the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−104, −44, 16, 76, 136} or includes positions offset by +7.5 kHz from a subcarrier of the NR carrier with a subcarrier index k* included in a subcarrier index set {−90, −30, 30, 90}. If the bandwidth of the NR carrier is equal to 15 MHz, the set of allowable positions for the NB-IoT carrier includes positions offset by +22.5 kHz from a subcarrier of the NR carrier with a subcarrier index k* included in a subcarrier index set {−224, −164, −104, −44, 16, 76, 136, 196} or includes positions offset by +7.5 kHz from a subcarrier of the NR carrier with a subcarrier index k* included in a subcarrier index set {−210, −150, −90, −30, 30, 90, 150, 210}. If the bandwidth of the NR carrier is equal to 20 MHz, the set of allowable positions for the NB-IoT carrier includes positions offset by +22.5 kHz from a subcarrier of the NR carrier with a subcarrier index k* included in a subcarrier index set {−254, −194, −134, −74, −14, 46, 106, 166, 226, 286} or includes positions offset by +7.5 kHz from a subcarrier of the NR carrier with a subcarrier index k* included in a subcarrier index set {−300, −240, −180, −120, −60, −50, 0, 60, 120, 180, 240, 300}. If the bandwidth of the NR carrier is equal to 25 MHz, the set of allowable positions for the NB-IoT carrier includes positions offset by +22.5 kHz from a subcarrier of the NR carrier with a subcarrier index k* included in a subcarrier index set {−374, −314, −254, −194, −134, −74, −14, 46, 106, 166, 226, 286, 346} or includes positions offset by +7.5 kHz from a subcarrier of the NR carrier with a subcarrier index k* included in a subcarrier index set {−360, −300, −240, −180, −120, −60, 0, 60, 120, 180, 240, 300, 360}. If the bandwidth of the NR carrier is equal to 30 MHz, the set of allowable positions for the NB-IoT carrier includes positions offset by +22.5 kHz from a subcarrier of the NR carrier with a subcarrier index k* included in a subcarrier index set {−464, −404, −344, −284, −224, −164, −104, −44, 16, 76, 136, 196, 256, 316, 376, 436} or includes positions offset by +7.5 kHz from a subcarrier of the NR carrier with a subcarrier index k* included in a subcarrier index set {−450, −390, −330, −270, −210, −150, −90, −30, 30, 90, 150, 210, 270, 330, 390, 450}.

Figure 3:
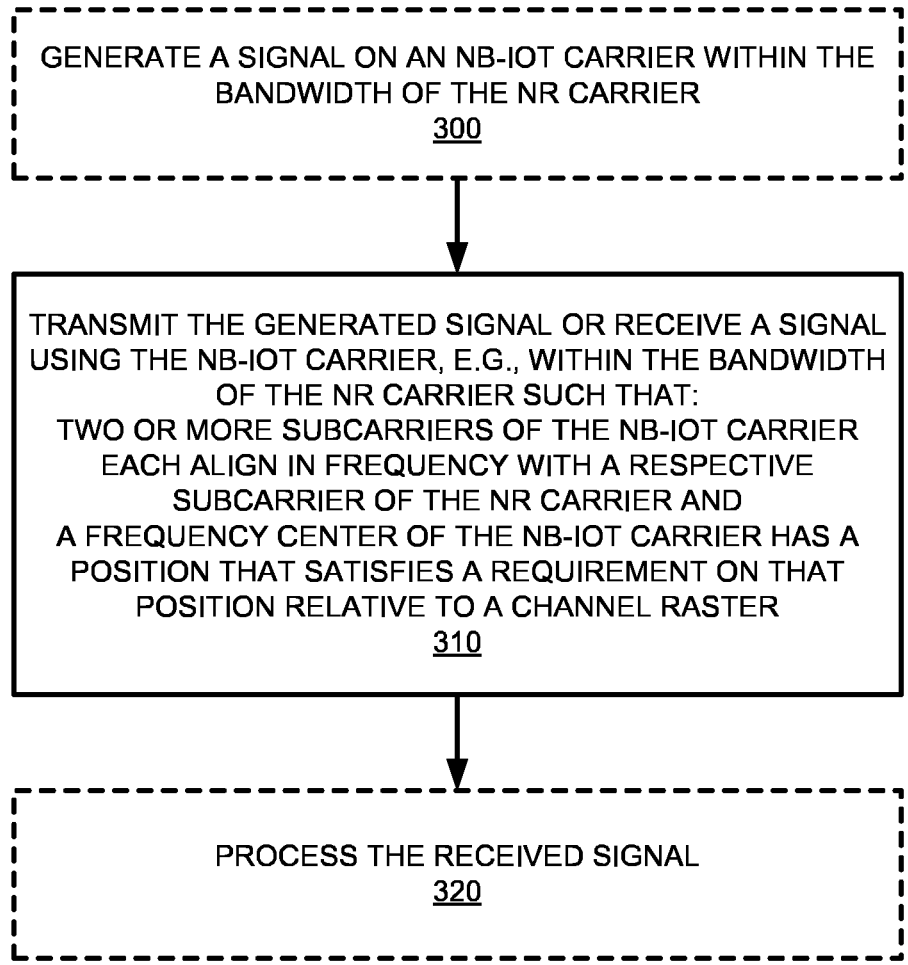
FIG. 3 is a logic flow diagram of a method for communicating in a wireless communication network according to some embodiments.

In view of the above modifications and variations, FIG. 3 depicts a method performed by a wireless device 14 or a radio network node 12, e.g., for communicating in a wireless communication network 10, in accordance with particular embodiments. The method includes transmitting or receiving using an NB-IoT carrier 16 (block 310). This may involve for instance transmitting or receiving a signal 18, 20 on the NB-IoT carrier 16. Regardless, the NB-IoT carrier 16 according to some embodiments as shown is within a bandwidth of an NR carrier 22. And, in some embodiments, transmission or reception using the NB-IoT carrier 16 is performed such that two or more subcarriers of the NB-IoT carrier 16 each align in frequency with a respective subcarrier of the NR carrier 22. Also, a frequency center 24 of the NB-IoT carrier 16 has a position that satisfies a requirement on that position relative to a channel raster 26. In some embodiments, the method further includes generating the signal 18, 20 (block 300). In this case, the transmitting or receiving step 310 includes transmitting the generated signal 18, 20 on the NB-IoT carrier 16 within the bandwidth of the NR carrier 22. In other embodiments, the transmitting or receiving step 310 includes receiving the signal 18, 20 on the NB-IoT carrier 16 within the bandwidth of the NR carrier 22. In this case, the method may further include processing the received signal 18, 20 (block 320).

Although not shown, the method may further include searching for the NB-IoT carrier 16 within the bandwidth of the NR carrier 22 according to the channel raster 26.

It may be the case that at least one-half of the subcarriers of the NB-IoT carrier 16 may each align in frequency with a respective subcarrier of the NR carrier 22. For example, every other one of the subcarriers of the NB-IoT carrier 16 may align in frequency with a respective subcarrier of the NR carrier 22.

In some embodiments, the requirement on the position of the frequency center 24) of the NB-IoT carrier 16 requires that the position of the frequency center 24 of the NB-IoT carrier be offset from the channel raster 26 by +/−2.5 kHz or +/−7.5 kHz.

The frequency center 24 of the NB-IoT carrier 16 may have a position in between two adjacent subcarriers of the NB-IoT carrier 16. The frequency center 24 of the NB-IoT carrier 16 may have one of multiple allowable positions defined for the NB-IoT carrier 16. Each of the multiple allowable positions may satisfy the requirement on that position relative to the channel raster 26 and may satisfy a requirement on that position relative to a subcarrier of the NR carrier 22. The requirement on the position of the frequency center 24 of the NB-IoT carrier 16 relative to a subcarrier of the NR carrier 22 may be that the position be offset from a subcarrier of the NR carrier 22 by any one of multiple allowable offsets. The multiple allowable offsets may include an offset of +7.5 kHz and an offset of +22.5 kHz.

In some embodiments, the multiple allowable positions include a set of positions, or a subset of the set of positions, where the set of positions includes: positions offset by +22.5 kHz from a subcarrier of the NR carrier with a subcarrier index k* defined by $$k* = \frac{20r-3}{6}, \frac{20r-4}{6}, \frac{20r-5}{6}, \text{ or } \frac{20r-6}{6},$$

for all integers r that produce a subcarrier index k* within the bandwidth of the NR carrier; and positions offset by +7.5 kHz from a subcarrier of the NR carrier with a subcarrier index k* defined by $$k* = \frac{20r}{6}, \frac{20r-1}{6}, \frac{20r-2}{6}, \text{ or } \frac{20r-3}{6},$$

for all integers r that produce a subcarrier index k* within the bandwidth of the NR carrier.

Accordingly, in some embodiments, the position of the frequency center 24 of the NB-IoT carrier 16 is a position offset by +22.5 kHz from a subcarrier of the NR carrier 22 with a subcarrier index k* defined by $$k* = \frac{20r-3}{6}, \frac{20r-4}{6}, \frac{20r-5}{6}, \text{ or } \frac{20r-6}{6},$$

for any integer r that produces a subcarrier index k* within the bandwidth of the NR carrier 22. Or, the position of the frequency center 24) of the NB-IoT carrier 16 is a position offset by +7.5 kHz from a subcarrier of the NR carrier 22 with a subcarrier index k* defined by $$k* = \frac{20r}{6}, \frac{20r-1}{6}, \frac{20r-2}{6}, \text{ or } \frac{20r-3}{6},$$

for any integer r that produces a subcarrier index k* within the bandwidth of the NR carrier 22. Here, the subcarrier index k* is an index of a subcarrier of the NR carrier relative to the channel raster.

In some embodiments, the multiple allowable positions include a set of positions, or a subset of the set of positions, where the set of positions includes positions offset by +22.5 kHz or by +7.5 kHz from a subcarrier of the NR carrier with a subcarrier index k* according to the following, e.g., as described in Table 2 below. If the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−144, −134, . . . , −14, −4, 6, 16, . . . , 136} or includes positions offset by +7.5 kHz from a subcarrier of the NR carrier with a subcarrier index k* included in a subcarrier index set {−140, −130, . . . , −10, 0, 10, . . . , 130, 140}. If the bandwidth of the NR carrier is equal to 15 MHz, the set of positions includes positions offset by +22.5 kHz from a subcarrier of the NR carrier with a subcarrier index k* included in a subcarrier index set {−224, −214, . . . , −14, −4, 6, 16, . . . , 226} or includes positions offset by +7.5 kHz from a subcarrier of the NR carrier with a subcarrier index k* included in a subcarrier index set {−220, −210, . . . , −10, 0, 10, . . . , 210, 220}. If the bandwidth of the NR carrier is equal to 20 MHz, the set of positions includes positions offset by +22.5 kHz from a subcarrier of the NR carrier with a subcarrier index k* included in a subcarrier index set {−304, −294, . . . , −14, −4, 6, 16, . . . , 296} or includes positions offset by +7.5 kHz from a subcarrier of the NR carrier with a subcarrier index k* included in a subcarrier index set {−300, −290, . . . , −10, 0, 10, . . . , 290, 300}. If the bandwidth of the NR carrier is equal to 25 MHz, the set of positions includes positions offset by +22.5 kHz from a subcarrier of the NR carrier with a subcarrier index k* included in a subcarrier index set {−384, −374, . . . , −14, −4, 6, 16, . . . , 386} or includes positions offset by +7.5 kHz from a subcarrier of the NR carrier with a subcarrier index k* included in a subcarrier index set {−390, −380, . . . , −10, 0, 10, . . . , 370, 380}. Or, if the bandwidth of the NR carrier is equal to 30 MHz, the set of positions includes positions offset by +22.5 kHz from a subcarrier of the NR carrier with a subcarrier index k* included in a subcarrier index set {−464, −454, . . . , −14, −4, 6, 16, . . . , 466} or includes positions offset by +7.5 kHz from a subcarrier of the NR carrier with a subcarrier index k* included in a subcarrier index set {−460, −450, . . . , −10, 0, 10, . . . , 450, 460}.

Accordingly, in some embodiments, the NR carrier 22 has a subcarrier spacing of 30 kHz. If the bandwidth of the NR carrier 22 is equal to 10 MHz, the position of the frequency center 24 of the NB-IoT carrier 16 is a position offset by +22.5 kHz from a subcarrier of the NR carrier 22 with a subcarrier index k* of −114, −104, −94, −54, −44, −34, 6, 16, 26, 66, 76, 86, 126, or 136, or a position offset by +7.5 kHz from a subcarrier of the NR carrier 22 with a subcarrier index k* of −140, −100, −90, −80, −40, −30, −20, 20, 30, 40, 80, 90, 100, or 140. If the bandwidth of the NR carrier 22 is equal to 15 MHz, the position of the frequency center 24 of the NB-IoT carrier 16 is a position offset by +22.5 kHz from a subcarrier of the NR carrier 22 with a subcarrier index k* of −224, −214, . . . , −14, −4, 6, 16, . . . , or 226, or a position offset by +7.5 kHz from a subcarrier of the NR carrier 22 with a subcarrier index k* of −220, −210, . . . , −10, 0, 10, . . . , 210, or 220. If the bandwidth of the NR carrier 22 is equal to 20 MHz, the position of the frequency center 24 of the NB-IoT carrier 16 is a position offset by +22.5 kHz from a subcarrier of the NR carrier 22 with a subcarrier index k* of −304, −294, . . . , −14, −4, 6, 16, . . . , or 296, or a position offset by +7.5 kHz from a subcarrier of the NR carrier 22 with a subcarrier index k* of −300, −290, . . . , −10, 0, 10, . . . , 290, or 300. If the bandwidth of the NR carrier 22 is equal to 25 MHz, the position of the frequency center 24 of the NB-IoT carrier 16 is a position offset by +22.5 kHz from a subcarrier of the NR carrier 22 with a subcarrier index k* of −384, −374, . . . , −14, −4, 6, 16, . . . , or 386, or a position offset by +7.5 kHz from a subcarrier of the NR carrier 22 with a subcarrier index k* of −390, −380, . . . , −10, 0, 10, . . . , 370, or 380. If the bandwidth of the NR carrier 22 is equal to 30 MHz, the position of the frequency center 24 of the NB-IoT carrier 16 is a position offset by +22.5 kHz from a subcarrier of the NR carrier 22 with a subcarrier index k* of −464, −454, . . . , −14, −4, 6, 16, . . . , or 466, or a position offset by +7.5 kHz from a subcarrier of the NR carrier 22 with a subcarrier index k* of −460, −450, . . . , −10, 0, 10, . . . , 450, or 460.

Alternatively or additionally, the frequency center 24 of the NB-IoT carrier 16 may have one of multiple allowable positions defined for the NB-IoT carrier 16, where the multiple allowable positions include a set of positions, or a subset of the set of positions, where the set of positions includes:
- positions offset by +22.5 kHz from a subcarrier of the NR carrier with a subcarrier index k* defined by 12 $L+2 \leq k^* \leq 12 L+7$ or by mod $(k^*, 12) \in \{2, 3, 4, 5, 6, 7\}$, for subcarrier indices k* within the bandwidth of the NR carrier, where $(-N_{RB}/2+1) \leq L \leq N_{RB}/2$, and where $N_{RB}$ is even and is a number of resource blocks included in the bandwidth of the NR carrier;
- positions offset by +22.5 kHz from a subcarrier of the NR carrier with a subcarrier index k* defined by 12 $L-4 \leq k^* \leq 12 L+1$ or by mod $(k^*, 12) \in \{-4, -3, -2, -1, 0, 1\}$, for subcarrier indices k* within the bandwidth of the NR carrier, where $-(N_{RB}-1)/2 \leq L \leq (N_{RB}-1)/2$, and where $N_{RB}$ is odd and is a number of resource blocks included in the bandwidth of the NR carrier;
- positions offset by +7.5 kHz from a subcarrier of the NR carrier with a subcarrier index k* defined by 12 $L+3 \leq k^* \leq 12 L+8$ or by mod $(k^*, 12) \in \{3, 4, 5, 6, 7, 8\}$, for subcarrier indices k* within the bandwidth of the NR carrier, where $(-N_{RB}/2+1) \leq L \leq N_{RB}/2$, and where $N_{RB}$ is even and is a number of resource blocks included in the bandwidth of the NR carrier; and
- positions offset by +7.5 kHz from a subcarrier of the NR carrier with a subcarrier index k* defined by 12 $L-3 \leq k^* \leq 12 L+2$ or by mod $(k^*, 12) \in \{-3, -2, -1, 0, 1, 2\}$, for subcarrier indices k* within the bandwidth of the NR carrier, where $-(N_{RB}-1)/2 \leq L \leq (N_{RB}-1)/2$, and where $N_{RB}$ is odd and is a number of resource blocks included in the bandwidth of the NR carrier.

The frequency center 24 of the NB-IoT carrier 16 may have one of multiple allowable positions defined for the NB-IoT carrier 16, wherein the multiple allowable positions include a set of positions, or a subset of the set of positions, wherein the set of positions includes positions offset by +22.5 kHz or by +7.5 kHz from a subcarrier of the NR carrier with a subcarrier index k* as follows, e.g., according to Table 3 below. If the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−114, −104, −94, −54, −44, −34, 6, 16, 26, 66, 76, 86, 126, 136} or includes positions offset by +7.5 kHz from a subcarrier of the NR carrier with a subcarrier index k* included in a subcarrier index set {−140, −100, −90, −80, −40, −30, −20, 20, 30, 40, 80, 90, 100, 140}. Alternatively or additionally, if the bandwidth of the NR carrier is equal to 15 MHz, the set of allowable positions for the NB-IoT carrier includes positions offset by +22.5 kHz from a subcarrier of the NR carrier with a subcarrier index k* included in a subcarrier index set {−224, −214, −174, −164, −154, −114, −104, −94, −54, −44, −34, 6, 16, 26, 66, 76, 86, 126, 136, 146, 186, 196, 206} or includes positions offset by +7.5 kHz from a subcarrier of the NR carrier with a subcarrier index k* included in a subcarrier index set {−220, −210, −200, −160, −150, −140, −100, −90, −80, −40, −30, −20, 20, 30, 40, 80, 90, 100, 140, 150, 160, 200, 210, 220}. Alternatively or additionally, if the bandwidth of the NR carrier is equal to 20 MHz, the set of allowable positions for the NB-IoT carrier includes positions offset by +22.5 kHz from a subcarrier of the NR carrier with a subcarrier index k* included in a subcarrier index set {−304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296} or includes positions offset by +7.5 kHz from a subcarrier of the NR carrier with a subcarrier index k* included in a subcarrier index set {−300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300}. Alternatively or additionally, if the bandwidth of the NR carrier is equal to 25 MHz, the set of allowable positions for the NB-IoT carrier includes positions offset by +22.5 kHz from a subcarrier of the NR carrier with a subcarrier index k* included in a subcarrier index set {−384, −374, −364, −324, −314, −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296, 336, 346, 356} or includes positions offset by +7.5 kHz from a subcarrier of the NR carrier with a subcarrier index k* included in a subcarrier index set {−370, −360, −350, −310, −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300, 310, 350, 360, 370}. Alternatively or additionally, if the bandwidth of the NR carrier is equal to 30 MHz, the set of allowable positions for the NB-IoT carrier includes positions offset by +22.5 kHz from a subcarrier of the NR carrier with a subcarrier index k* included in a subcarrier index set {−464, −454, −414, −404, −394, −354, −344, −334, −294, −284, −274, −234, −224, −214, −174, −164, −154, −114, −104, −94, −54, −44, −34, 6, 16, 26, 66, 76, 86, 126, 136, 146, 186, 196, 206, 246, 256, 266, 306, 316, 326, 366, 376, 386, 426, 436, 446} or includes positions offset by +7.5 kHz from a subcarrier of the NR carrier with a subcarrier index k* included in a subcarrier index set {−460, −450, −440, −400, −390, −380, −340, −330, −320, −280, −270, −260, −220, −210, −200, −160, −150, −140, −100, −90, −80, −40, −30, −20, 20, 30, 40, 80, 90, 100, 140, 150, 160, 200, 210, 220, 260, 270, 280, 320, 330, 340, 380, 390, 400, 440, 450, 460}.

Accordingly, in other embodiments, the NR carrier 22 has a subcarrier spacing of 30 kHz. If the bandwidth of the NR carrier 22 is equal to 10 MHz, the position of the frequency center 24 of the NB-IoT carrier 16 is a position offset by +22.5 kHz from a subcarrier of the NR carrier 22 with a subcarrier index k* of −114, −104, −94, −54, −44, −34, 6, 16, 26, 66, 76, 86, 126, or 136, or a position offset by +7.5 kHz from a subcarrier of the NR carrier 22 with a subcarrier index k* of −140, −100, −90, −80, −40, −30, −20, 20, 30, 40, 80, 90, 100, or 140. If the bandwidth of the NR carrier 22 is equal to 15 MHz, the position of the frequency center 24 of the NB-IoT carrier 16 is a position offset by +22.5 kHz from a subcarrier of the NR carrier 22 with a subcarrier index k* of −224, −214, −174, −164, −154, −114, −104, −94, −54, −44, −34, 6, 16, 26, 66, 76, 86, 126, 136, 146, 186, 196, or 206, or a position offset by +7.5 kHz from a subcarrier of the NR carrier 22 with a subcarrier index k* of −220, −210, −200, −160, −150, −140, −100, −90, −80, −40, −30, −20, 20, 30, 40, 80, 90, 100, 140, 150, 160, 200, 210, or 220. If the bandwidth of the NR carrier 22 is equal to 20 MHz, the position of the frequency center 24 of the NB-IoT carrier 16 is a position offset by +22.5 kHz from a subcarrier of the NR carrier 22 with a subcarrier index k* of −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, or 296, or a position offset by +7.5 kHz from a subcarrier of the NR carrier 22 with a subcarrier index k* of −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, or 300. If the bandwidth of the NR carrier 22 is equal to 25 MHz, the position of the frequency center 24 of the NB-IoT carrier 16 is a position offset by +22.5 kHz from a subcarrier of the NR carrier 22 with a subcarrier index k* of −384, −374, −364, −324, −314, −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296, 336, 346, or 356, or a position offset by +7.5 kHz from a subcarrier of the NR carrier 22 with a subcarrier index k* of −370, −360, −350, −310, −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300, 310, 350, 360, or 370. If the bandwidth of the NR carrier 22 is equal to 30 MHz, the position of the frequency center 24 of the NB-IoT carrier 16 is a position offset by +22.5 kHz from a subcarrier of the NR carrier 22 with a subcarrier index k* of −464, −454, −414, −404, −394, −354, −344, −334, −294, −284, −274, −234, −224, −214, −174, −164, −154, −114, −104, −94, −54, −44, −34, 6, 16, 26, 66, 76, 86, 126, 136, 146, 186, 196, 206, 246, 256, 266, 306, 316, 326, 366, 376, 386, 426, 436, or 446, or a position offset by +7.5 kHz from a subcarrier of the NR carrier 22 with a subcarrier index k* of −460, −450, −440, −400, −390, −380, −340, −330, −320, −280, −270, −260, −220, −210, −200, −160, −150, −140, −100, −90, −80, −40, −30, −20, 20, 30, 40, 80, 90, 100, 140, 150, 160, 200, 210, 220, 260, 270, 280, 320, 330, 340, 380, 390, 400, 440, 450, or 460.

In some embodiments, the NB-IoT carrier 16 has a 67.5 kHz guard band on each side of the NB-IoT carrier 16 within a single NR resource block.

The frequency center of the NB-IoT carrier may have one of multiple allowable positions defined for the NB-IoT carrier, where the multiple allowable positions include a set of positions, or a subset of the set of positions, where the set of positions includes positions offset by +22.5 kHz or by +7.5 kHz from a subcarrier of the NR carrier with a subcarrier index k* as follows, e.g., according to Table 4 below. If the bandwidth of the NR carrier is equal to 10 MHz, the set of allowable positions for the NB-IoT carrier includes positions offset by +22.5 kHz from a subcarrier of the NR carrier with a subcarrier index k* included in a subcarrier index set {−104, −44, 16, 76, 136} or includes positions offset by +7.5 kHz from a subcarrier of the NR carrier with a subcarrier index k* included in a subcarrier index set {−90, −30, 30, 90}. If the bandwidth of the NR carrier is equal to 15 MHz, the set of allowable positions for the NB-IoT carrier includes positions offset by +22.5 kHz from a subcarrier of the NR carrier with a subcarrier index k* included in a subcarrier index set {−224, −164, −104, −44, 16, 76, 136, 196} or includes positions offset by +7.5 kHz from a subcarrier of the NR carrier with a subcarrier index k* included in a subcarrier index set {−210, −150, −90, −30, 30, 90, 150, 210}. If the bandwidth of the NR carrier is equal to 20 MHz, the set of allowable positions for the NB-IoT carrier includes positions offset by +22.5 kHz from a subcarrier of the NR carrier with a subcarrier index k* included in a subcarrier index set {−254, −194, −134, −74, −14, 46, 106, 166, 226, 286} or includes positions offset by +7.5 kHz from a subcarrier of the NR carrier with a subcarrier index k* included in a subcarrier index set {−300, −240, −180, −120, −60, −50, 0, 60, 120, 180, 240, 300}. If the bandwidth of the NR carrier is equal to 25 MHz, the set of allowable positions for the NB-IoT carrier includes positions offset by +22.5 kHz from a subcarrier of the NR carrier with a subcarrier index k* included in a subcarrier index set {−374, −314, −254, −194, −134, −74, −14, 46, 106, 166, 226, 286, 346} or includes positions offset by +7.5 kHz from a subcarrier of the NR carrier with a subcarrier index k* included in a subcarrier index set {−360, −300, −240, −180, −120, −60, 0, 60, 120, 180, 240, 300, 360}. If the bandwidth of the NR carrier is equal to 30 MHz, the set of allowable positions for the NB-IoT carrier includes positions offset by +22.5 kHz from a subcarrier of the NR carrier with a subcarrier index k* included in a subcarrier index set {−464, −404, −344, −284, −224, −164, −104, −44, 16, 76, 136, 196, 256, 316, 376, 436} or includes positions offset by +7.5 kHz from a subcarrier of the NR carrier with a subcarrier index k* included in a subcarrier index set {−450, −390, −330, −270, −210, −150, −90, −30, 30, 90, 150, 210, 270, 330, 390, 450}.

Accordingly, in other embodiments, the NR carrier 22 has a subcarrier spacing of 30 kHz. If the bandwidth of the NR carrier 22 is equal to 10 MHz, the position of the frequency center 24 of the NB-IoT carrier 16 is a position offset by +22.5 kHz from a subcarrier of the NR carrier 22 with a subcarrier index k* of −104, −44, 16, 76, or 136, or a position offset by +7.5 kHz from a subcarrier of the NR carrier 22 with a subcarrier index k* of −90, −30, 30, or 90. If the bandwidth of the NR carrier 22 is equal to 15 MHz, the position of the frequency center 24 of the NB-IoT carrier 16 is a position offset by +22.5 kHz from a subcarrier of the NR carrier 22 with a subcarrier index k* of −224, −164, −104, −44, 16, 76, 136, or 196, or a position offset by +7.5 kHz from a subcarrier of the NR carrier 22 with a subcarrier index k* of −210, −150, −90, −30, 30, 90, 150, or 210. If the bandwidth of the NR carrier 22 is equal to 20 MHz, the position of the frequency center 24 of the NB-IoT carrier 16 is a position offset by +22.5 kHz from a subcarrier of the NR carrier 22 with a subcarrier index k* of −254, −194, −134, −74, −14, 46, 106, 166, 226, or 286, or a position offset by +7.5 kHz from a subcarrier of the NR carrier 22 with a subcarrier index k* of −300, −240, −180, −120, −60, −50, 0, 60, 120, 180, 240, or 300. If the bandwidth of the NR carrier 22 is equal to 25 MHz, the position of the frequency center 24 of the NB-IoT carrier 16 is a position offset by +22.5 kHz from a subcarrier of the NR carrier 22 with a subcarrier index k* of −374, −314, −254, −194, −134, −74, −14, 46, 106, 166, 226, 286, or 346, or a position offset by +7.5 kHz from a subcarrier of the NR carrier 22 with a subcarrier index k* of −360, −300, −240, −180, −120, −60, 0, 60, 120, 180, 240, 300, or 360. If the bandwidth of the NR carrier 22 is equal to 30 MHz, the position of the frequency center 24 of the NB-IoT carrier 16 is a position offset by +22.5 kHz from a subcarrier of the NR carrier 22 with a subcarrier index k* of −464, −404, −344, −284, −224, −164, −104, −44, 16, 76, 136, 196, 256, 316, 376, or 436, or a position offset by +7.5 kHz from a subcarrier of the NR carrier 22 with a subcarrier index k* of −450, −390, −330, −270, −210, −150, −90, −30, 30, 90, 150, 210, 270, 330, 390, or 450.

In some embodiments, a bandwidth of the NB-IoT carrier overlaps only a single NR resource block. The NR carrier may have a 30 kHz subcarrier spacing. In some cases, at least one-quarter of the subcarriers of the NB-IoT carrier each align in frequency with a respective sub-carrier of the NR carrier. The NR carrier may have a 60 kHz subcarrier spacing. In other embodiments, the NB-IoT carrier has a 15 kHz subcarrier spacing.

Figure 4:
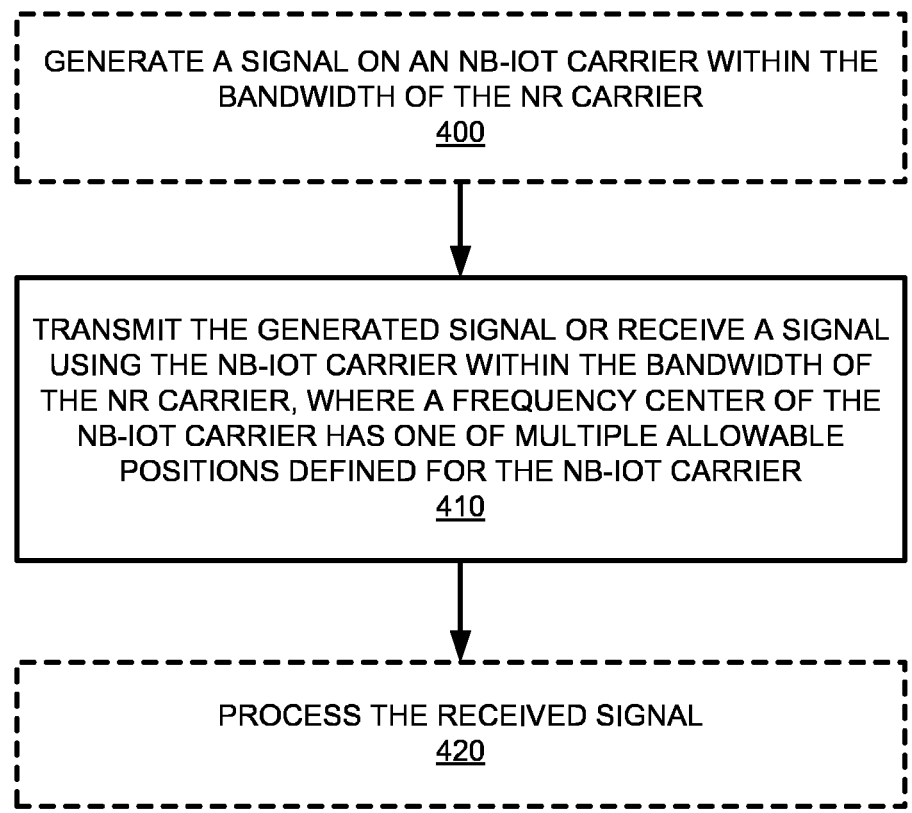
FIG. 4 is a logic flow diagram of a method for communicating in a wireless communication network according to other embodiments.

FIG. 4 depicts a method performed by a wireless device 14 or a radio network node 12 in accordance with other particular embodiments. The method includes transmitting or receiving using a Narrowband Internet-of-Things, NB-IoT, carrier within a bandwidth of a New Radio, NR, carrier, wherein a frequency center of the NB-IoT carrier has one of multiple allowable positions defined for the NB-IoT carrier (block 410). In some embodiments, the method includes generating a signal and the transmitting or receiving includes transmitting the generated signal on the NB-IoT carrier within the bandwidth of the NR carrier (block 400). In other embodiments, the transmitting or receiving includes receiving a signal on the NB-IoT carrier within the bandwidth of the NR carrier and processing the received signal (block 420). The method may further include searching for the NB-IoT carrier within the bandwidth of the NR carrier according to the channel raster.

In some embodiments, the multiple allowable positions include a set of positions, or a subset of the set of positions, where the set of positions includes: positions offset by +22.5 kHz from a subcarrier of the NR carrier with a subcarrier index k* defined by $$k^* = \frac{20r-3}{6}, \frac{20r-4}{6}, \frac{20r-5}{6}, \text{ or } \frac{20r-6}{6},$$

for all integers r that produce a subcarrier index k* within the bandwidth of the NR carrier; and positions offset by +7.5 kHz from a subcarrier of the NR carrier with a subcarrier index k* defined by $$k^* = \frac{20r}{6}, \frac{20r-1}{6}, \frac{20r-2}{6}, \text{ or } \frac{20r-3}{6},$$

for all integers r that produce a subcarrier index k* within the bandwidth of the NR carrier.

In some embodiments, the multiple allowable positions include a set of positions, or a subset of the set of positions, where the set of positions includes positions offset by +22.5 kHz or by +7.5 kHz from a subcarrier of the NR carrier with a subcarrier index k* according to Table 2 below.

The frequency center of the NB-IoT carrier may have one of multiple allowable positions defined for the NB-IoT carrier, where the multiple allowable positions include a set of positions, or a subset of the set of positions, where the set of positions includes:
  positions offset by +22.5 kHz from a subcarrier of the NR carrier with a subcarrier index k* defined by 12 L+2≤k*≤12 L+7 or by mod (k*, 12)∈{2, 3, 4, 5, 6, 7}, for subcarrier indices k* within the bandwidth of the NR carrier, where $(-N_{RB}/2+1) \leq L \leq N_{RB}/2$, and where $N_{RB}$ is even and is a number of resource blocks included in the bandwidth of the NR carrier;
  positions offset by +22.5 kHz from a subcarrier of the NR carrier with a subcarrier index k* defined by 12 L−4≤k*≤12 L+1 or by mod (k*, 12)∈{−4, −3, −2, −1, 0, 1}, for subcarrier indices k* within the bandwidth of the NR carrier, where $-(N_{RB}-1)/2 \leq L \leq (N_{RB}-1)/2$, and where $N_{RB}$ is odd and is a number of resource blocks included in the bandwidth of the NR carrier;
  positions offset by +7.5 kHz from a subcarrier of the NR carrier with a subcarrier index k* defined by 12 L+3≤k*≤12 L+8 or by mod (k*, 12)∈{3, 4, 5, 6, 7, 8}, for subcarrier indices k* within the bandwidth of the NR carrier, where $(-N_{RB}/2+1) \leq L \leq N_{RB}/2$, and where $N_{RB}$ is even and is a number of resource blocks included in the bandwidth of the NR carrier; and
  positions offset by +7.5 kHz from a subcarrier of the NR carrier with a subcarrier index k* defined by 12 L−3≤k*≤12 L+2 or by mod (k*, 12)∈{−3, −2, −1, 0, 1, 2}, for subcarrier indices k* within the bandwidth of the NR carrier, where $-(N_{RB}-1)/2 \leq L \leq (N_{RB}-1)/2$, and where $N_{RB}$ is odd and is a number of resource blocks included in the bandwidth of the NR carrier.

The frequency center of the NB-IoT carrier may have one of multiple allowable positions defined for the NB-IoT carrier, wherein the multiple allowable positions include a set of positions, or a subset of the set of positions, wherein the set of positions includes positions offset by +22.5 kHz or by +7.5 kHz from a subcarrier of the NR carrier with a subcarrier index k* according to Table 3 below.

In some embodiments, the NB-IoT carrier has a 67.5 kHz guard band on each side of the NB-IoT carrier within a single NR resource block.

The frequency center of the NB-IoT carrier may have one of multiple allowable positions defined for the NB-IoT carrier, where the multiple allowable positions include a set of positions, or a subset of the set of positions, where the set of positions includes positions offset by +22.5 kHz or by +7.5 kHz from a subcarrier of the NR carrier with a subcarrier index k* according to Table 4 below. Two or more subcarriers of the NB-IoT carrier may each align in frequency with a respective subcarrier of the NR carrier, and a frequency center of the NB-IoT carrier may have a position that satisfies a requirement on that position relative to a channel raster.

At least one-half of the subcarriers of the NB-IoT carrier may each align in frequency with a respective subcarrier of the NR carrier. Every other subcarrier of the NB-IoT carrier may align in frequency with a respective subcarrier of the NR carrier.

The frequency center of the NB-IoT carrier may have a position in between two adjacent subcarriers of the NB-IoT carrier. Each of the multiple allowable positions may satisfy a requirement on that position relative to a channel raster and may satisfy a requirement on that position relative to a subcarrier of the NR carrier. The requirement on the position of the frequency center of the NB-IoT carrier relative to a subcarrier of the NR carrier may be that the position be offset from a subcarrier of the NR carrier by any one of multiple allowable offsets. The multiple allowable offsets may include an offset of +7.5 kHz and an offset of +22.5 kHz.

In some embodiments, a bandwidth of the NB-IoT carrier overlaps only a single NR resource block. The NR carrier may have a 15 kHz, 30 kHz or 60 kHz subcarrier spacing.

According to some embodiments, a method for communicating in a wireless communication network includes transmitting or receiving using a Narrowband Internet-of-Things, NB-IoT, carrier within a bandwidth of a New Radio, NR, carrier such that two or more subcarriers of the NB-IoT carrier each align in frequency with a respective subcarrier of the NR carrier and a frequency center of the NB-IoT carrier has a position that satisfies a requirement on that position relative to a channel raster.

According to some embodiments, a method for communicating in a wireless communication network includes transmitting or receiving using a Narrowband Internet-of-Things, NB-IoT, carrier within a bandwidth of a New Radio, NR, carrier, wherein a frequency center of the NB-IoT carrier has one of multiple allowable positions defined for the NB-IoT carrier.

Further aspects of the present invention are directed to an apparatus, network node, base station, wireless device, user equipment (UE), network devices, Machine-To-Computer (MTC) devices, IoT devices, computer program products or computer readable storage medium corresponding to the methods summarized above and functional implementations of the above-summarized methods.

Note that the apparatuses (e.g., wireless devices or radio network nodes) described below may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
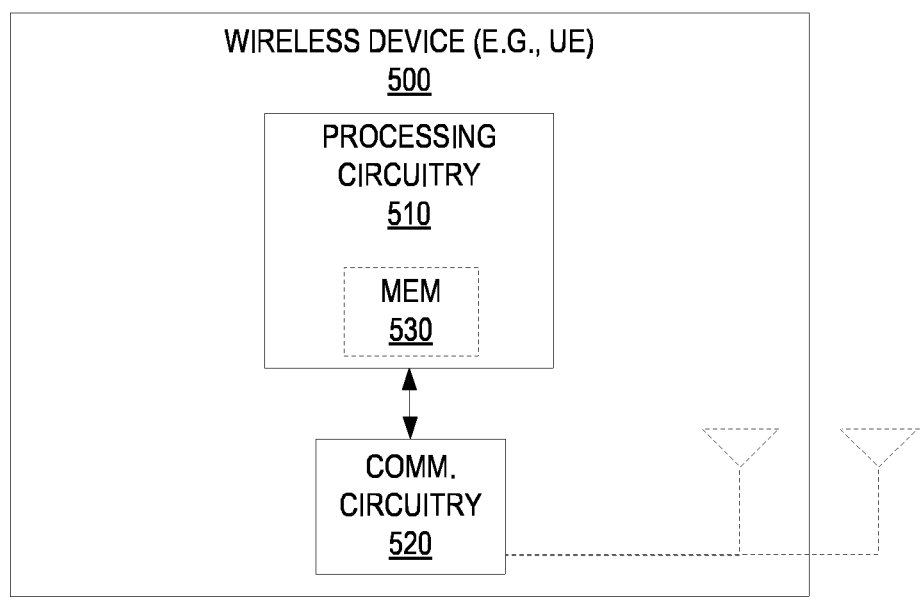
FIG. 5 is a block diagram of a wireless device according to some embodiments.

FIG. 5 for example illustrates a wireless device 500 (e.g., wireless device 14) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, e.g., in FIGS. 3 and/or 4, such as by executing instructions stored in memory 530. The processing circuitry 510 in this regard may implement certain functional means, units, or modules.

Figure 6:
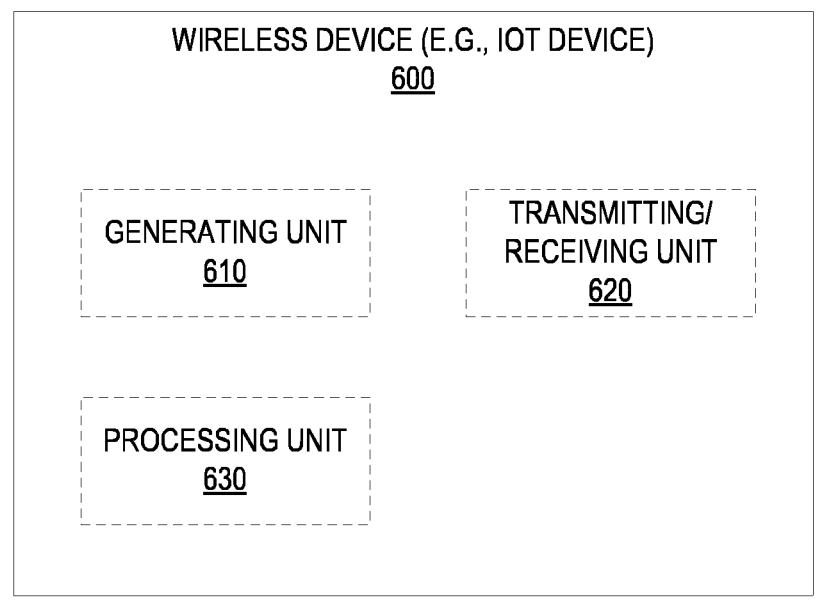
FIG. 6 is a block diagram of a wireless device according to other embodiments.

FIG. 6 illustrates a functional implementation by a wireless device 600 (e.g., wireless device 14), according to one or more embodiments. The wireless device 600 includes a transmitting/receiving unit 620 configured to transmit or receive using an NB-IoT carrier within a bandwidth of a NR carrier such that two or more subcarriers of the NB-IoT carrier each align in frequency with a respective subcarrier of the NR carrier and a frequency center of the NB-IoT carrier has a position that satisfies a requirement on that position relative to a channel raster. The wireless device 600 may include a generating unit 610 configured to generate a signal and the transmitting/receiving unit 620 may be configured to transmit the generated signal on the NB-IoT carrier within the bandwidth of the NR carrier. The wireless device 600 may also include a processing unit 630 configured to process the received signal.

Figure 7:
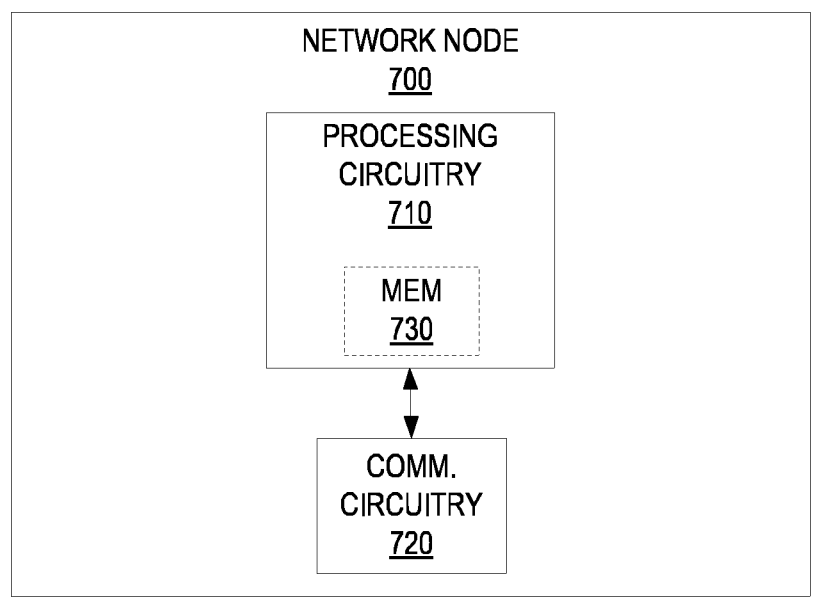
FIG. 7 is a block diagram of a network node according to some embodiments.

FIG. 7 illustrates a radio network node 700 (e.g., radio network node 12) as implemented in accordance with one or more embodiments. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, such as by executing instructions stored in memory 730. The processing circuitry 710 in this regard may implement certain functional means, units, or modules.

Figure 8:
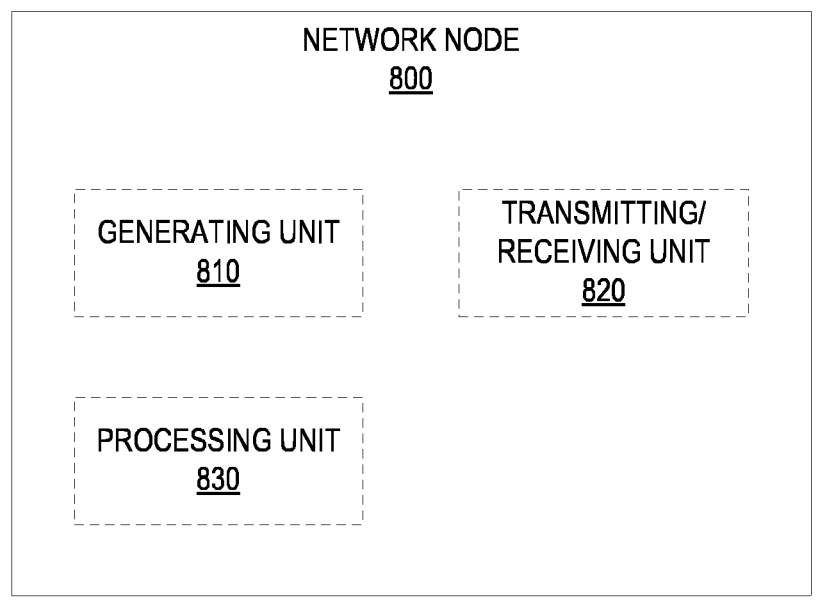
FIG. 8 is a block diagram of a network node according to other embodiments.

FIG. 8 illustrates a functional implementation by a radio network node 800 (e.g., radio network node 12). The radio network node 800 includes a transmitting/receiving unit 820 configured to transmit or receive using an NB-IoT carrier within a bandwidth of a NR carrier where a frequency center of the NB-IoT carrier has one of multiple allowable positions defined for the NB-IoT carrier. The radio network node 800 may include a generating unit 810 configured to generate a signal and the transmitting/receiving unit 820 may be configured to transmit the generated signal on the NB-IoT carrier within the bandwidth of the NR carrier. The radio network node 800 may also include a processing unit 830 configured to process the received signal.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

According to some embodiments herein, New Radio (NR) resources in the frequency and time domains can be configured for embedding Narrowband Internet-of-Things (NB-IoT) inside an NR carrier. However, to ensure an efficient coexistence between NR and NB-IoT, mutual interference between the two systems needs to be minimized, while considering resource efficiency.

Some embodiments described herein provide solutions for better coexistence of an NB-IoT carrier embedded inside an NR carrier, e.g., with 30 kHz subcarrier spacing. In general, if the NB-IoT carrier can be placed in arbitrary places, this would satisfy its channel raster requirement. But this type of flexibility would require a large guard band to be reserved within an NR carrier to prevent interference between the two systems. The methodologies described herein help a wireless device or radio network node to determine the position of an NB-IoT carrier to be placed within an NR carrier, to minimize interference between NR and NB-IoT. To this end, the locations of NB-IoT carrier center that lead to the maximum subcarrier grid alignment between NR and NB-IoT have been identified. Moreover, along with maximum subcarrier alignment, the possible locations of NB-IoT carrier center such that a minimum number of NR resource blocks (RBs) is used for accommodating the coexistence have also been identified. Finally, the possible locations of NB-IoT carrier center for which the maximum guard band can be used for NB-IoT within one NR RB were derived.

Certain embodiments may provide one or more technical advantages. Some embodiments can be used to effectively deploy NB-IoT in coexistence with NR in the case of 30 kHz NR subcarrier spacing. More particularly, some embodiments address the problems of subcarrier grids alignment, interference (between NR and NB-IoT) reduction, and resource utilization, which are key issues in the coexistence of NR and NB-IoT. When deploying NB-IoT inside an NR carrier, some embodiments determine the best locations of an NB-IoT carrier center that lead to: 1) the maximum subcarrier grid alignment between NR and NB-IoT, thus minimizing the interference between these two systems, 2) the minimum reserved resources of NR RB, thus enhancing resource efficiency, and/or 3) the maximum potential guard band that can be considered for NB-IoT within on NR RB. This, in turn, facilitates the coexistence of NB-IoT within NR bandwidth, e.g., in the case of 30 kHz NR subcarrier spacing.

Figure 9:
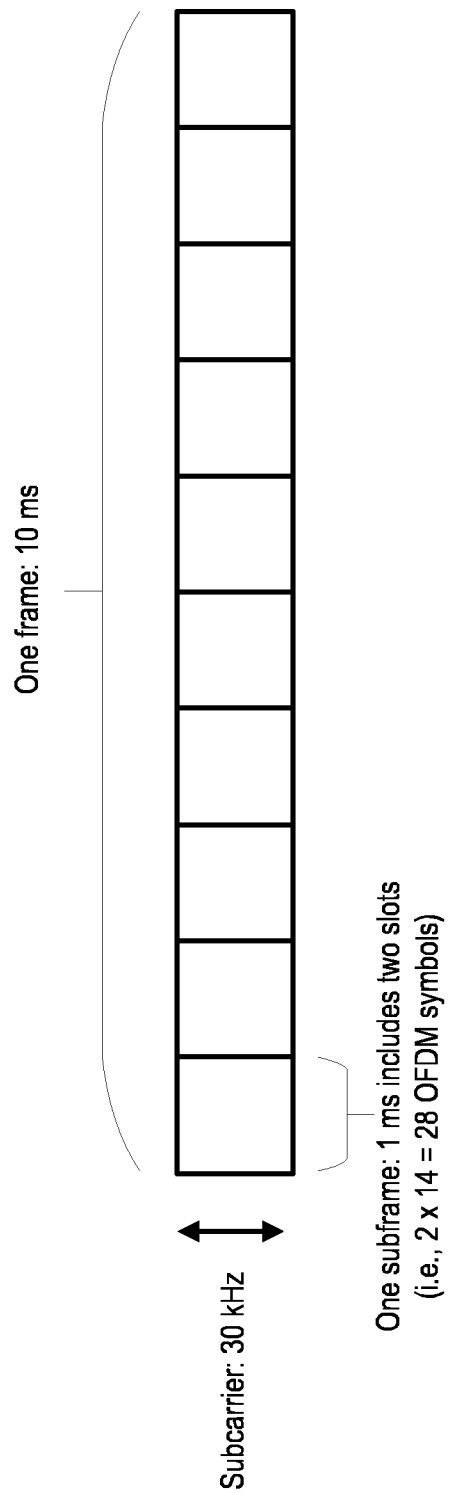
FIG. 9 is a block diagram of orthogonal frequency division multiplexing (OFDM) symbol duration and subframe duration for 30 kHz NR subcarrier spacing according to some embodiments.

More particularly, in various embodiments, the NB-IoT system position is determined within an 5G NR carrier (with 30 kHz subcarrier spacing) that minimizes the interference between the two systems. Compared to LTE numerology where only one type of subcarrier spacing (15 kHz) is considered, NR supports different types of subcarrier spacing. Consequently, slot (or mini-slot in NR) length can be different between NR and NB-IoT, depending on numerology. The embodiments described herein are directed to the coexistence of NR and NB-IoT for 30 kHz NR subcarrier spacing. For the case of 30 kHz NR subcarrier spacing, orthogonal frequency division multiplexing (OFDM) symbol duration and subframe duration are shown in FIG. 9. In NR, frame, subframe, and slot are, respectively, 10 ms units, 1 ms units, and 14 OFDM symbols. Clearly, slot duration and number of slots in each subframe depends on the subcarrier spacing.

In NB-IoT, the subcarrier spacing is 15 kHz. Therefore, full orthogonality cannot be easily maintained between NR and NB-IoT in case of 30 kHz NR subcarrier spacing. Nonetheless, it is possible to significantly reduce interference by maximizing the number of aligned subcarriers between NR and NB-IoT.

One NB-IoT resource block includes 12 subcarriers, which is equivalent to a 180 kHz bandwidth. One NR resource block with 12 subcarriers and 30 kHz subcarrier spacing occupies a 360 kHz bandwidth. In this case, placing NB-IoT RB within an NR RB can enhance the resource efficiency thus reducing overhead in the NB-IoT and NR coexistence.

Table 1 lists the frequency bands used by both NR and NB-IoT, according to some embodiments. For each band, the possible channel bandwidths for 30 kHz subcarrier spacing are shown. Table 1 shows that the possible supported NR channel bandwidths for NR and NB-IoT coexistence are: 10, 15, 20, 25, and 30 MHz.

Table 1 also lists the channel rasters that represent steps and frequencies that can be used by a UE to determine the RF channel positions in the uplink and downlink. The channel raster of NR depends on the frequency band.

An NB-IoT UE searches for NB-IoT carriers on a 100 kHz raster grid and, thus, a feasible center frequency for UE can be expressed as 100*m, with m being an integer number. As see in Table 1, the channel raster for the considered common bands for NR and NB-IoT is 100 kHz.

TABLE 1

Frequency bands used by both NR and NB-IoT

| Band | Uplink (UL) | Downlink (DL) | Channel bandwidth for 30 kHz NR subcarrier spacing [MHz] | Raster step [kHz] |
|---|---|---|---|---|
| 1 | 1920-1980 MHz | 2110-2170 MHz | 10, 15, 20 | 100 |
| 2 | 1850-1910 MHz | 1930-1990 MHz | 10, 15, 20 | 100 |
| 3 | 1710-1785 MHz | 1805-1880 MHz | 10, 15, 20, 25, 30 | 100 |
| 5 | 824-849 MHz | 869-894 MHz | 10, 15, 20 | 100 |
| 8 | 880-915 MHz | 925-960 MHz | 10, 15, 20 | 100 |
| 12 | 699-716 MHz | 729-746 MHz | 10, 15 | 100 |
| 20 | 832-862 MHz | 791-821 MHz | 10, 15, 20 | 100 |
| 25 | 1850-1915 MHz | 1930-1995 MHz | 10, 15, 20 | 100 |

TABLE 1-continued

Frequency bands used by both NR and NB-IoT

| Band | Uplink (UL) | Downlink (DL) | Channel bandwidth for 30 kHz NR subcarrier spacing [MHz] | Raster step [kHz] |
|---|---|---|---|---|
| 28 | 703-748 MHz | 758-803 MHz | 10, 15, 20 | 100 |
| 66 | 1710-1780 MHz | 2110-2200 MHz | 10, 15, 20 | 100 |
| 70 | 1695-1710 MHz | 1995-2020 MHz | 10, 15, 20, 25 | 100 |

There are several considerations to take into account. The raster defines a subset of RF reference frequencies that can be used to identify the RF channel position in the uplink and downlink. The RF reference frequency for an RF channel maps to a resource element on the carrier. Hereinafter, the channel raster is referred to as a point on the raster grid that defines the RF reference frequency. One NR RB in the frequency domain consists of 12 subcarriers. Note that an NR resource block is a one-dimensional measure spanning the frequency domain only, while LTE uses two-dimensional resource blocks of 12 subcarriers in the frequency domain and one slot in the time domain. The number of RBs is denoted by $N_{RB}$. The indexes of the middle RB for even and odd numbers of RBs are, respectively, $N_{RB}/2$ and $(N_{RB}-1)/2$. The NR subcarriers may be indexed relative to the NR raster. Hence, the NR raster may be located on subcarrier with index 0.

Figure 10:
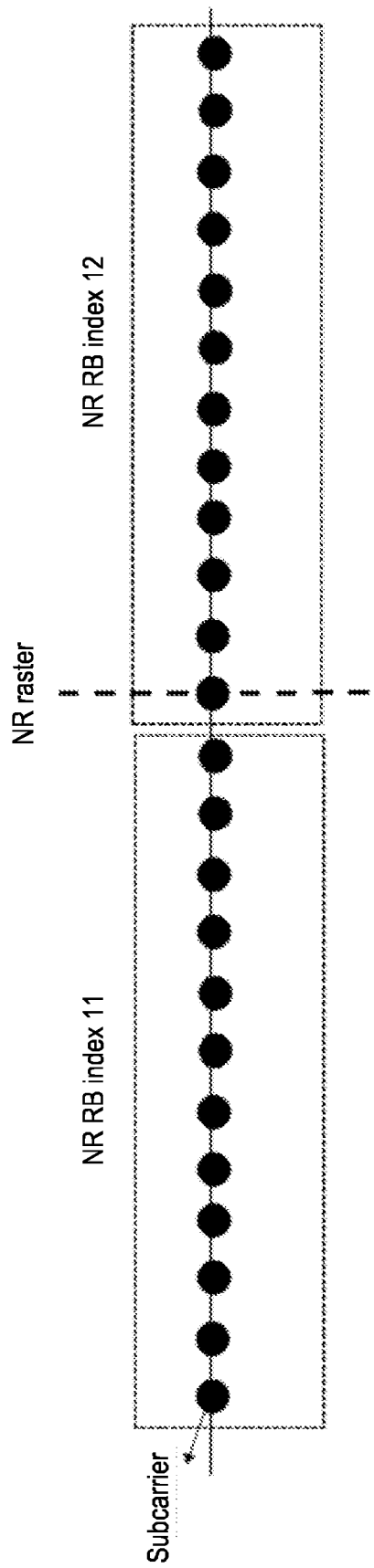
FIG. 10 is a block diagram of the NR raster location for a 10 MHz channel bandwidth with 24 RBs and 30 kHz subcarrier spacing, according to some embodiments.

For NR carriers with an even number of RBs ($N_{RB}$), the channel raster is located at subcarrier index #0 in an RB with index $N_{RB}/2$. For NR carriers with an odd number of RBs, the channel raster is located at subcarrier index #6 in an RB with index $(N_{RB}-1)/2$. As an example, the pictorial representation of NR raster location for 10 MHz channel bandwidth with 24 RBs and 30 kHz subcarrier spacing is illustrated in FIG. 10.

Figure 11:
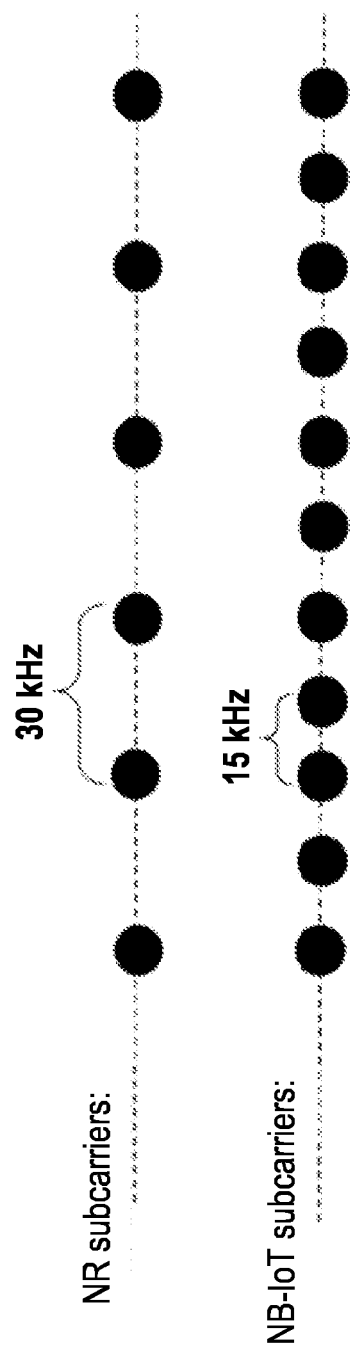
FIG. 11 is a block diagram of subcarrier grids for NR and NB-IoT according to some embodiments.

The design of NB-IoT initial access channels, e.g., Narrowband Primary Synchronization Signal (NPSS), Narrowband Secondary Synchronization Signal (NSSS), and Narrowband Physical Broadcast Channel (NPBCH), allows a raster offset of 2.5 kHz, −2.5 kHz, 7.5 kHz, or −7.5 kHz from the 100 kHz raster grid. Thus, an NB-IoT anchor carrier can be placed at 100n±2.5 kHz or 100n±7.5 kHz, where n is an integer. In NB-IoT, the DL anchor carrier is located in the center of the NB-IoT channel, i.e. the channel center point is located between two NB-IoT subcarriers. A raster offset of ±2.5 or ±7.5 kHz is allowed for in-band and guard-band operation modes. A condition may be found under which the maximum alignment between NR and NB-IoT DL subcarrier grids is achieved. FIG. 11 illustrates subcarrier grids for NR and NB-IoT. As shown in FIG. 11, the maximum number of NR subcarriers, which can be aligned with NB-IoT subcarriers, is six.

Consider first subcarrier orthogonality between NR and NB-IoT. Let $F_1$ and $T_1$ be subcarrier spacing and symbol duration of NR. Also, $F_2$ and $T_2$ are subcarrier spacing and symbol duration of NB-IoT:

$$F_1 = \frac{1}{T_1} = 30 \text{ kHz}$$

$$F_2 = \frac{1}{T_2} = 15 \text{ kHz}$$

$$F_1 = 2F_2$$

$$T_1 = T_2/2$$

Now, the orthogonality between NR and NB-IoT subcarriers will be explored. The interference from subcarrier n of NB-IoT on subcarrier m of NR is:

$$I_{2,1} = \frac{1}{T_1} \int_0^{T_1} (e^{j2\pi n F_1 t})^* (e^{j2\pi n F_2 t}) dt$$

$$I_{2,1} = \frac{1}{T_1} \int_0^{T_1} (e^{j2\pi (m-\frac{n}{2})t/T_1}) dt$$

To ensure orthogonality and avoid intercarrier interference:

$$m - \frac{n}{2} = \text{integer}$$

The above condition can be satisfied when n is even. Therefore, the potential interference from NB-IoT on NR is not completely eliminated when both use the same resources.

The interference from subcarrier m of NR on subcarrier n of NB-IoT is:

$$I_{1,2} = \frac{1}{T_2} \int_0^{T_2} (e^{j2\pi n F_2 t})^* (e^{j2\pi m F_1 t}) dt$$

$$I_{1,2} = \frac{1}{T_2} \int_0^{T_2} (e^{j2\pi (n-2m)t/T_2}) dt$$

To ensure orthogonality and avoid intercarrier interference:

$$n - 2m = \text{integer}$$

The above condition can always be satisfied when n and m are integers. As a result, with the proposed subcarrier alignment scheme, the potential interference from NR on NB-IoT is eliminated. Moreover, the proposed approach scientifically mitigates interference from NB-IoT on NR by maximizing the number of aligned subcarriers between these two systems.

Figure 12:
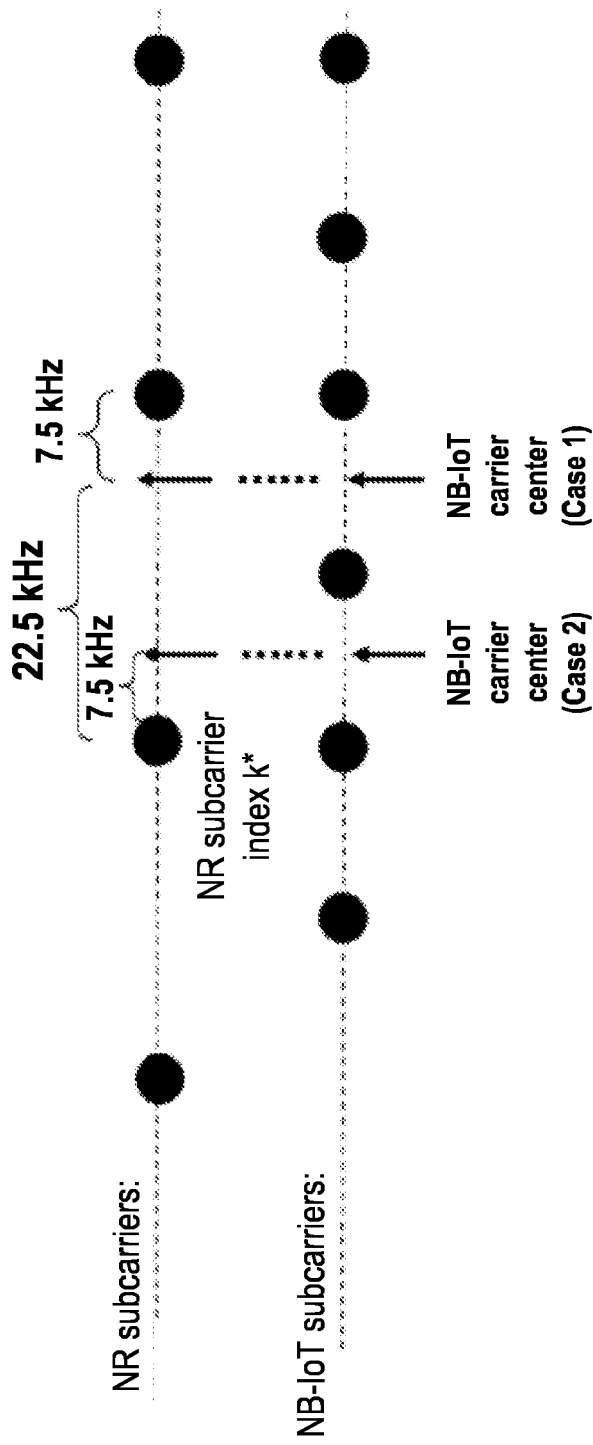
FIG. 12 is a block diagram of maximum subcarrier grid alignment between NR and NB-IoT according to some embodiments.

Consider now NB-IoT carrier placement considering subcarrier grids alignment. Let k be an integer that represents the NR subcarrier index relative to the NR channel raster. The NR subcarriers are located at frequencies 100 m+30 k [kHz] (m is an integer). FIG. 12 illustrates a maximum subcarrier grid alignment between NR and NB-IoT. As shown in FIG. 12, the possible center frequencies for the NB-IoT carrier, is placed between NR subcarriers k and k+1 can be expressed by:

Case 1: 100 m+30 k+22.5, [kHz]
Case 2: 100 m+30 k+7.5, [kHz].

In other words, the NB-IoT carrier center should be placed 7.5 kHz or 22.5 kHz after NR subcarrier with index k. In addition, the location of the NB-IoT carrier center must satisfy the raster offset requirement.

Considering the raster requirement, an NB-IoT carrier center can be placed at 100n±2.5 kHz or 100n±7.5 kHz. A feasible subcarrier index must satisfy one of the following equations:

Case 1:

$$100n+2.5=100m+30k+22.5 \qquad (15)$$

$$100n-2.5=100m+30k+22.5 \qquad (16)$$

$$100n-7.5=100m+30k+22.5 \quad (17)$$

$$100n+7.5=100m+30k+22.5 \quad (18)$$

Case 2:

$$100n+2.5=100m+30k+7.5 \quad (19)$$

$$100n-2.5=100m+30k+7.5 \quad (20)$$

$$100n-7.5=100m+30k+7.5 \quad (21)$$

$$100n+7.5=100m+30k+7.5 \quad (22)$$

Now, suppose that the feasible NB-IoT center is placed 7.5 or 22.5 kHz after the frequency of NR subcarrier with index k'. Note that k can be index of any NR subcarrier while k* is the index of a desired subcarrier which is considered for alignment. In this case, we can show that k* is in a set of all integer numbers generated by:

Case 1:

$$\frac{20r-3}{6}, \frac{20r-4}{6}, \frac{20r-5}{6}, \text{ or } \frac{20r-6}{6}, \quad (23)$$

Case 2:

$$\frac{20r}{6}, \frac{20r-1}{6}, \frac{20r-2}{6}, \text{ or } \frac{20r-3}{6}, \quad (24)$$

where r is an integer. For instance, for r=2, using $$\frac{20r-4}{6},$$

the NB-IoT carrier center can be placed between NR subcarriers k*=6 (relative to the channel raster) and k*+1=7. In this case, the NB-IoT carrier center can be placed 22.5 kHz after NR subcarrier with index k*=6.

One goal is to identify possible locations of NB-IoT carrier center such that only one NR resource block overlaps with the NB-IoT resource block. Among the NB-IoT carrier center locations that ensure the maximum subcarrier grid alignment, the aim is to find those that leads to the minimum NR resource reservation. In particular, an efficient coexistence scenario is determined in which at most one NR resource block is reserved for deploying NB-IoT.

Figure 15:
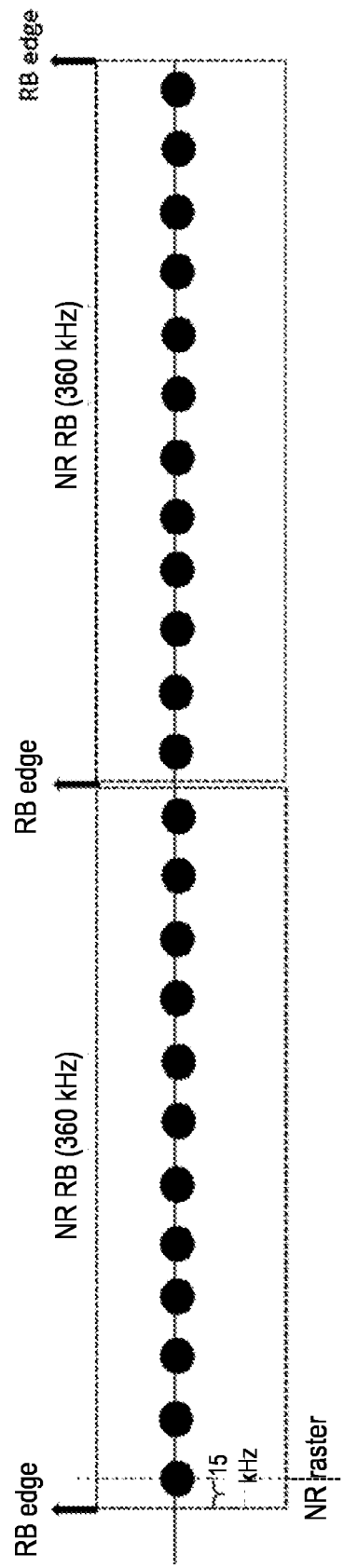
FIG. 15 is a block diagram of resource block edges for an even number of NR resource blocks according to some embodiments.
Figure 16:
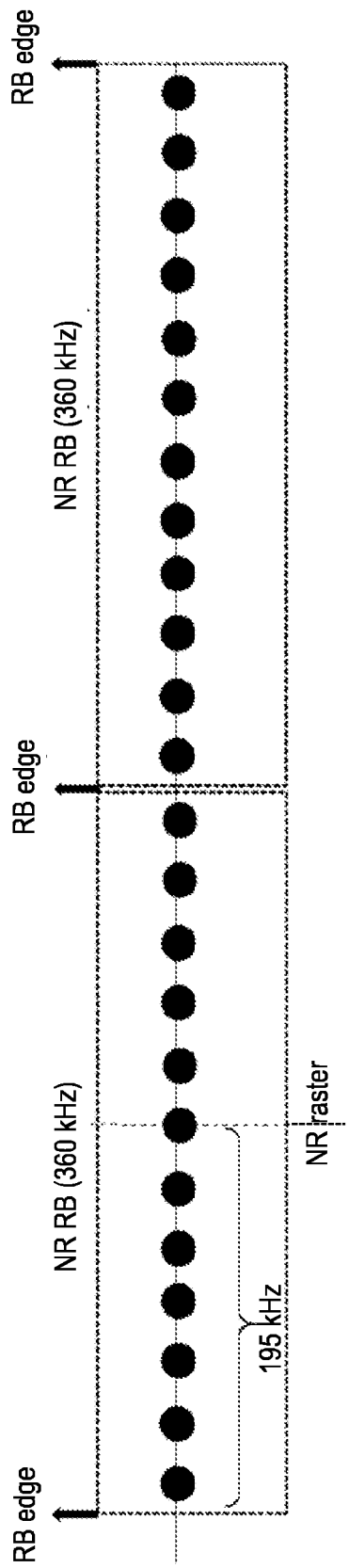
FIG. 16 is a block diagram of resource block edges for an odd number of NR resource blocks according to some embodiments.

First, the edge frequencies of NR RBs (i.e., the minimum and maximum frequencies of each RB) relative to the NR raster are identified. FIGS. 15 and 16 illustrate RB edges for even and odd number of NR resource blocks, respectively.

For an even number of NR RBs, the minimum and maximum frequencies of the first RB, relative to the NR raster is:

$$F_{min}=-15 \text{ kHz}$$

$$F_{max}=F_{min}+360=345 \text{ kHz}$$

Therefore, relative to the NR raster, the edge frequencies of RBs can be given by:

$$\text{RB\_edge\_freq\_even}=-15+360L[\text{kHz}] \quad (25)$$

where L is an integer in set $\{-N_{RB}/2+1, \ldots, N_{RB}/2+1\}$, with $N_{RB}$ being the total number of NR RBs.

For an odd number of NR RBs, the minimum and maximum frequencies of the first RB, relative to the NR raster is:

$$F_{min}=-195 \text{ kHz}$$

$$F_{max}=F_{min}+360=165 \text{ kHz}$$

Therefore, relative to the NR raster, the edge frequencies of RBs can be given by:

$$\text{RB\_edge\_freq\_odd}=-195+360L[\text{kHz}] \quad (26)$$

where L is an integer in set $\{-(N_{RB}-1)/2, \ldots, (N_{RB}-1)/2+1\}$, with $N_{RB}$ being the total number of NR RBs.

TABLE 2

Possible locations of NB-oT carrier center for which maximum subcarrier grid alignment is achieved between NR and NB-IoT.

| NR channel bandwidth and the number of RBs ($N_{RB}$) for 30 kHz subcarrier spacing | Possible indexes of NR subcarriers k* (relative to NR raster). NB-IoT center is placed on (30 k* + 22.5, kHz) relative to the NR channel raster | Possible indexes of NR subcarriers k* (relative to NR raster). NB-IoT center is placed on (30 k* + 7.5, kHz) relative to the NR channel raster |
|---|---|---|
| 10 MHz, $N_{RB}$ = 24 | −144, −134, . . . , −14, −4, 6, 16, . . . , 136 | −140, −130, . . . , −10, 0, 10, . . . , 130, 140 |
| 15 MHz, $N_{RB}$ = 38 | −224, −214, . . . , −14, −4, 6, 16, . . . , 226 | −220, −210, . . . , −10, 0, 10, . . . , 210, 220 |
| 20 MHz, $N_{RB}$ = 51 | −304, −294, . . . , −14, −4, 6, 16, . . . , 296 | −300, −290, . . . , −10, 0, 10, . . . , 290, 300 |
| 25 MHz, $N_{RB}$ = 65 | −384, −374, . . . , −14, −4, 6, 16, . . . , 386 | −390, −380, . . . , −10, 0, 10, . . . , 370, 380 |
| 30 MHz, $N_{RB}$ = 78 | −464, −454, . . . , −14, −4, 6, 16, . . . , 466 | −460, −450, . . . , −10, 0, 10, . . . , 450, 460 |

Figure 13:
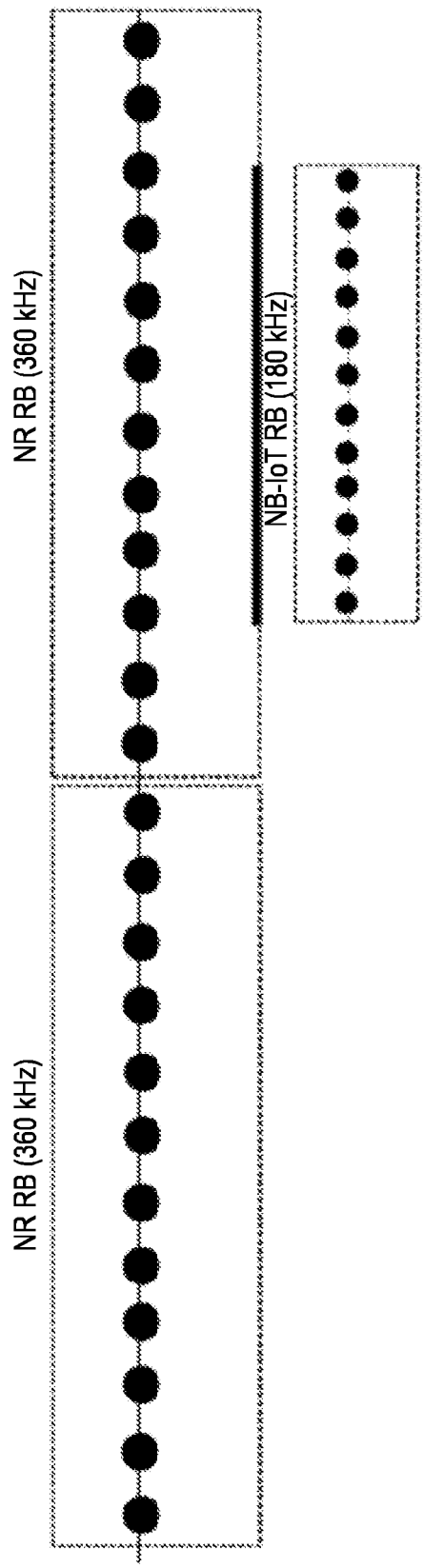
FIG. 13 is a block diagram of an NB-IoT resource block that overlaps with one NR resource block according to some embodiments.
Figure 14:
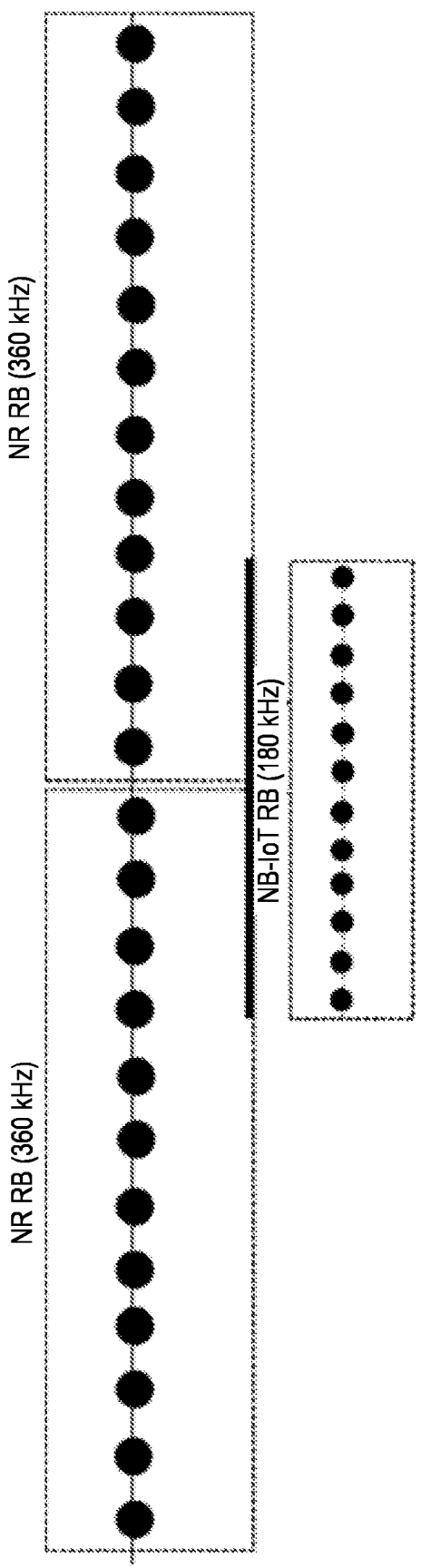
FIG. 14 is a block diagram of an NB-IoT resource block that overlaps with two NR resource blocks according to some embodiments.

Consider now efficient NB-IoT resource block placement in coexistence with NR. Possible locations were provided above of an NB-IoT carrier center for which the maximum subcarrier grid alignment is achieved between NR and NB-IoT. The location of the NB-IoT carrier impacts the number of NR resource blocks that overlap with NB-IoT resource blocks, as shown in FIGS. 13 and 14. FIG. 13 illustrates an NB-IoT resource block that overlaps with one NR resource block. FIG. 14 illustrates an NB-IoT resource block that overlaps with two NR resource blocks.

Using the result above regarding NB-IoT carrier placement considering subcarrier grids alignment, an NB-IoT carrier center frequency (relative to NR raster) is:

$$F_{nb}=30k^*+22.5 \quad \text{(Case 1)}$$

$$F_{nb}=30k^*+7.5 \quad \text{(Case 2)}$$

Hence, the maximum and minimum frequencies of an NB-IoT resource block are, respectively, $(F_{nb}+90)$, and $(F_{nb}-90)$.

Subsequently, to ensure that the NB-IoT resource block overlaps with only one NR RB, we should have the following:

For an even number of NR RBs:

$$(-15+360L)+90 \leq F_{nb} \leq (-15+360(L+1))-90$$

where $(-N_{RB}/2+1) \leq L \leq N_{RB}/2$ is an integer. This leads to:

Case 1:

$$\frac{360L+52.5}{30} \leq k^* \leq \frac{360L+232.5}{30} \quad (27)$$

$$12L+2 \leq k^* \leq 12L+7$$

Equivalently: mod $(k^*, 12) \in \{2, 3, 4, 5, 6, 7\}$.
Note that, a module operator represented by z=mod (x, y) is used, where x, y, and z are integers, and z is the reminder after the division of x by y.

Case 2:

$$\frac{360L+67.5}{30} \leq k^* \leq \frac{360L+247.5}{30} \quad (28)$$

$$12L+3 \leq k^* \leq 12L+8$$

Equivalently: mod $(k^*, 12) \in \{3, 4, 5, 6, 8\}$.

For an odd number of NR RBs:

$$(-195+360L)+90 \leq F_{nb} \leq (-195+360(L+1))-90$$

where $-(N_{RB}-1)/2 \leq L \leq (N_{RB}-1)/2$ is an integer.
This leads to:

Case 1:

$$\frac{360L-127.5}{30} \leq k^* \leq \frac{360L+52.5}{30} \quad (29)$$

$$12L-4 \leq k^* \leq 12L+1$$

Equivalently: mod $(k^*, 12) \in \{-4, -3, -2, -1, 0, 1\}$.

Case 2:

$$\frac{360L-112.5}{30} \leq k^* \leq \frac{360L+67.5}{30} \quad (3)$$

$$12L-3 \leq k^* \leq 12L+2$$

Equivalently: mod $(k^*, 12) \in \{-3, -2, -1, 0, 1, 2\}$.

TABLE 3

Possible locations of NB-IoT carrier center for which maximum subcarrier grid alignment is achieved between NR and NB-IoT. Also, minimum NR RB is used.

| NR channel bandwidth and the number of RBs ($N_{RB}$) for 30 kHz subcarrier spacing | k*: Possible indexes of NR subcarriers. NB-IoT center is placed on (30 k* + 22.5, kHz) relative to the NR channel raster | k*: Possible indexes of NR subcarriers. NB-IoT center is placed on (30 k*+ 7.5, kHz) relative to the NR channel raster |
|---|---|---|
| 10 MHz, $N_{RB}$ = 24 | −114 −104 −94 −54 −44 −34 6 16 26 66 76 86 126 136 | −140 −100 −90 −80 −40 −30 −20 20 30 40 80 90 100 140 |
| 15 MHz, $N_{RB}$ = 38 | −224 −214 −174 −164 −154 −114 −104 −94 −54 −44 −34 6 16 26 66 76 86 126 136 146 186 196 206 | −220 −210 −200 −160 −150 −140 −100 −90 −80 −40 −30 −20 20 30 40 80 90 100 140 150 160 200 210 220 |
| 20 MHz, $N_{RB}$ = 51 | −304 −264 −254 −244 −204 −194 −184 −144 −134 −124 −84 −74 −64 −24 −14 −4 36 46 56 96 106 116 156 166 176 216 226 236 276 286 296 | −300 −290 −250 −240 −230 −190 −180 −170 −130 −120 −110 −70 −60 −50 −10 0 10 50 60 70 110 120 130 170 180 190 230 240 250 290 300 |
| 25 MHz, $N_{RB}$ = 65 | −384 −374 −364 −324 −314 −304 −264 −254 −244 −204 −194 −184 −144 −134 −124 −84 −74 −64 −24 −14 −4 36 46 56 96 106 116 156 166 176 216 226 236 276 286 296 336 346 356 | −370 −360 −350 −310 −300 −290 −250 −240 −230 −190 −180 −170 −130 −120 −110 −70 −60 −50 −10 0 10 50 60 70 110 120 130 170 180 190 230 240 250 290 300 310 350 360 370 |
| 30 MHz, $N_{RB}$ = 78 | −464 −454 −414 −404 −394 −354 −344 −334 −294 −284 −274 −234 −224 −214 −174 −164 −154 −114 −104 −94 −54 −44 −34 6 16 26 66 76 86 126 136 146 186 196 206 246 256 266 306 316 326 366 376 386 426 436 446 | −460 −450 −440 −400 −390 −380 −340 −330 −320 −280 −270 −260 −220 −210 −200 −160 −150 −140 −100 −90 −80 −40 −30 −20 20 30 40 80 90 100 140 150 160 200 210 220 260 270 280 320 330 340 380 390 400 440 450 460 |

Figure 17:
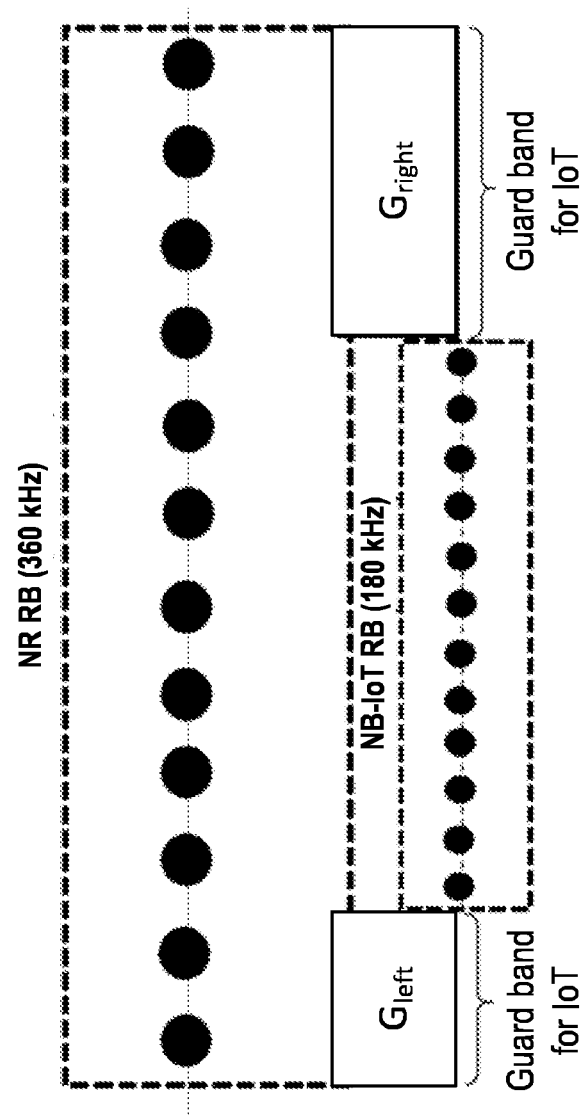
FIG. 17 is a block diagram of the deployment of an NB-IoT resource block inside an NR resource block, with a potential guard band, according to some embodiments.

Consider now the guard band for placing NB-IoT resource block inside an NR resource block. In some embodiments, the possible amount of guard band that can be considered for NB-IoT carrier in coexistence with NR is computed. Placing an NB-IoT RB close to the middle of an NR RB is a desired case for the coexistence. This case can facilitate the deployment of NB-IoT inside NR as it allows using maximum guard band around an NB-IoT RB, while overlapping with one NR RB. FIG. 17 illustrates the deployment of an NB-IoT RB inside an NR RB, with a potential guard band.

Using equations (27)-(30), the amount of guard band inside and NR RB that can be considered for the NB-IoT is:

Even Number of NR RBs:

$$G_{right}=[-15+360(L+1)]-[F_{nb}+90]$$

$$G_{left}=[F_{nb}-90]-[-15+360L]$$

Case 1:

$$G_{right}=360L-30k^*+232.5$$

$$G_{left}=30k^*-52.5-360L$$

where $G_{right}$ and $G_{left}$ are guard bands on the right and left sides of the NB-IoT RB, as shown in FIG. 17.

For a symmetric guard band case, the maximum NB-IoT guard band within one NR RB is:

$$G=\min\{G_{right}, G_{left}\}$$

Case 2:

$$G_{right}=360L-30k^*+247.5$$

$$G_{left}=30k^*-67.5-360L$$

Odd number of NR RBs:

$$G_{right}=[-195+360(L+1)]-[F_{nb}+90]$$

$$G_{left}=[F_{nb}-90]-[-195+360L]$$

Case 1:

$$G_{right}=360L-30k^*+52.5$$

$$G_{left}=30k^*+127.5-360L$$

For a symmetric guard band case, the maximum NB-IoT guard band within one NR RB is:

$$G=\min\{G_{right}, G_{left}\}$$

Case 2:

$$G_{right}=360L-30k^*+67.5$$

$$G_{left}=30k^*+112.5-360L$$

In Table 4, the locations of an NB-IoT carrier center for which the maximum guard band within one NR RB can be considered for NB-IoT are presented.

with the example above for k*=6 described in conjunction with equations 9 and 10 above. Case A for instance satisfies equation (1) above.

By contrast, Case B (FIG. 18B) shows the NB-IoT carrier center positioned at 157.5 kHz, which although amounting to an offset of +22.5 kHz to NR subcarrier 4, does not satisfy the channel raster requirement of being +/−2.5 or +/−7.5 kHz from the 100 kHz raster. Case C (FIG. 18C), as another example, shows the NB-IoT carrier center positioned at 222.5 kHz, which although satisfying the channel raster requirement by being +7.5 kHz from the 100 kHz raster, does not amount to +7.5 or +22.5 from NR subcarrier #6.

Figure 19:
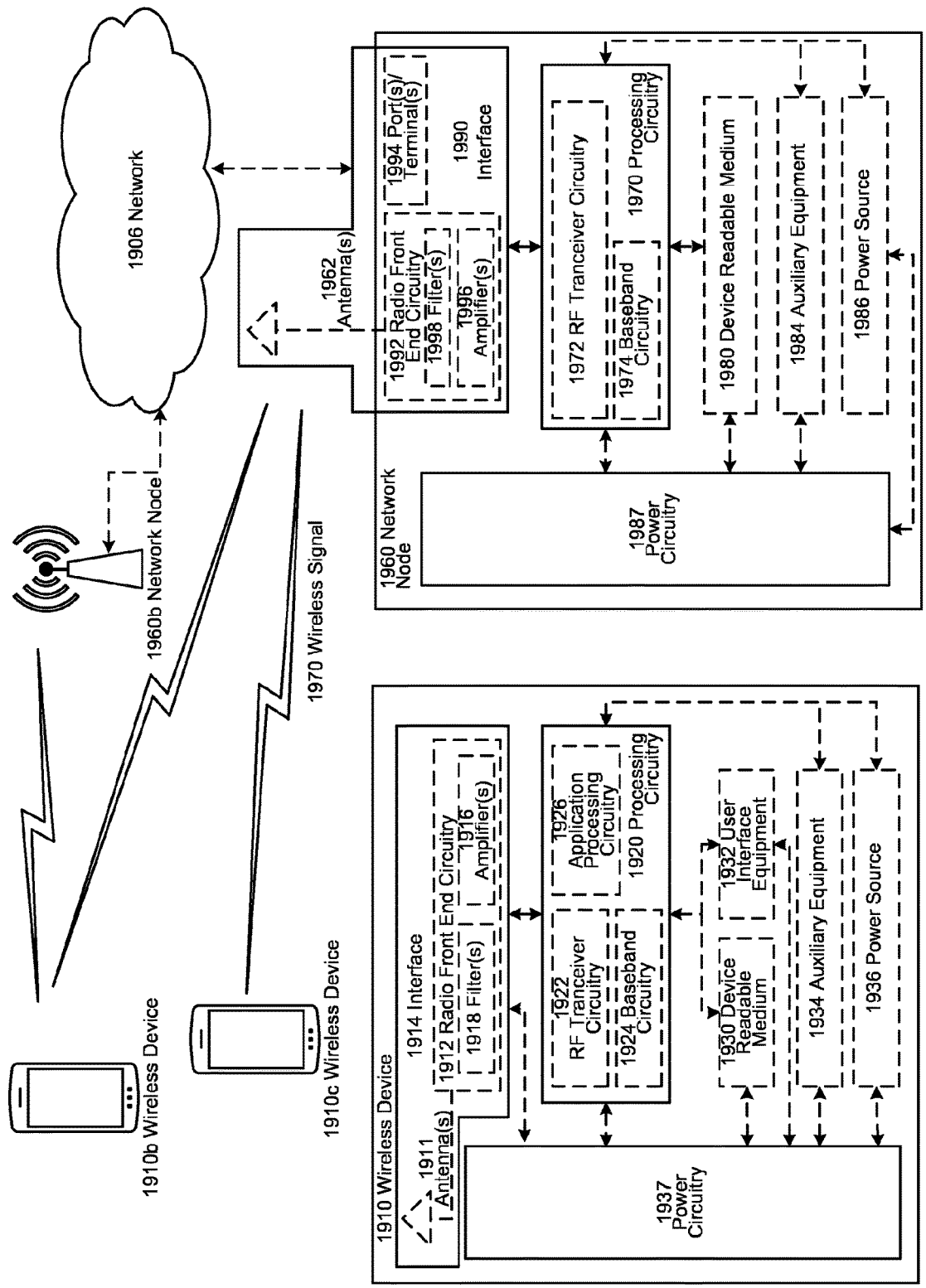
FIG. 19 shows an example wireless network.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960b, and WDs 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, network node 1960 and wireless device (VVD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommuni-

TABLE 4

Possible locations of NB-IoT carrier center for which the maximum guard band can be used for NB-IoT within one NR RB.

| NR channel bandwidth and number of RBs ($N_{RB}$) for 30 kHz subcarrier spacing | k*: Possible indexes of NR subcarriers. NB-IoT center is placed on (30 k* + 22.5, kHz) relative to the NR channel raster | k*: Possible indexes of NR subcarriers. NB-IoT center is placed on (30 k* + 7.5, kHz) relative to the NR channel raster | Maximum symmetric NB-IoT guard band within one NR RB |
|---|---|---|---|
| 10 MHz, $N_{RB}$ = 24 | −104 −44 16 76 136 | −90 −30 30 90 | 67.5 kHz |
| 15 MHz, $N_{RB}$ = 38 | −224 −164 −104 −44 16 76 136 196 | −210 −150 −90 −30 30 90 150 210 | 67.5 kHz |
| 20 MHz, $N_{RB}$ = 51 | −254 −194 −134 −74 −14 46 106 166 226 286 | −300 −240 −180 −120 −60 0 60 120 180 240 300 | 67.5 kHz |
| 25 MHz, $N_{RB}$ = 65 | −374 −314 −254 −194 −134 −74 −14 46 106 166 226 286 346 | −360 −300 −240 −180 −120 −60 0 60 120 180 240 300 360 | 67.5 kHz |
| 30 MHz, $N_{RB}$ = 78 | −464 −404 −344 −284 −224 −164 −104 −44 16 76 136 196 256 316 376 436 | −450 −390 −330 −270 −210 −150 −90 −30 30 90 150 210 270 330 390 450 | 67.5 kHz |

As a concrete example, FIGS. 18A-C show different possible cases for placement of an NB-IoT carrier within an NR carrier. The NR carrier is shown with subcarriers 0-11 spaced every 30 kHz starting at 15 kHz. The 100 kHz raster therefore occurs at frequencies 15, 115, 215, and 315 kHz. In case A (FIG. 18A), the NB-IoT center is positioned at 217.5 kHz, which is offset +2.5 kHz to the 100 kHz raster and +22.5 kHz to NR subcarrier #6. This Case A is consistent cations System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LTE, NR, WiFi, or Bluetooth wireless technologies. These wireless technologies may be integrated into the same or different chip or set of chips and other components within network node 1960.

Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (VVD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source (e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
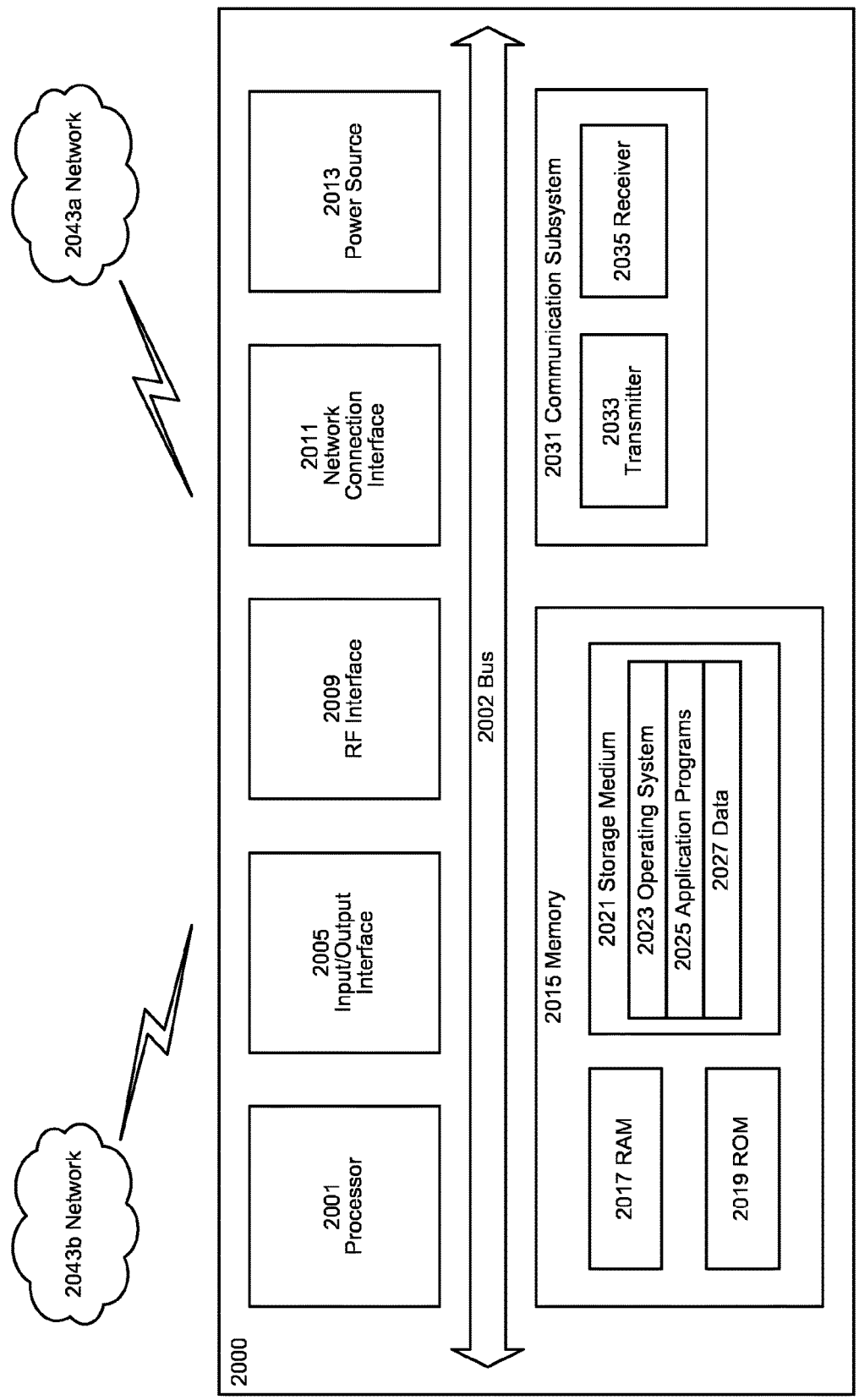
FIG. 20 shows one embodiment of a UE.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 20200 may be any UE identified by the $3^{rd}$ Generation Partnership Project (3GPP), including a NB-IoT UE, a machine type communication (MTC) UE, and/or an enhanced MTC (eMTC) UE. UE 2000, as illustrated in FIG.

20, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 2001 may be configured to process computer instructions and data. Processing circuitry 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043*a*. Network 2043*a* may encompass wired and/or wireless networks such as a local-area network (LAN), a wide-area network (WAN), a computer network, a wireless network, a telecommunications network, another like network or any combination thereof. For example, network 2043*a* may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processing circuitry 2001 to provide storage or caching of data or computer instructions during the execution of software programs such as the operating system, application programs, and device drivers. ROM 2019 may be configured to provide computer instructions or data to processing circuitry 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data file 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processing circuitry 2001 may be configured to communicate with network 2043*b* using communication subsystem 2031. Network 2043*a* and network 2043*b* may be the same network or networks or different network or networks. Communication subsystem 2031 may be configured to include one or more transceivers used to communicate with network 2043b. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, UTRAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043b may encompass wired and/or wireless networks such as a local-area network (LAN), a wide-area network (WAN), a computer network, a wireless network, a telecommunications network, another like network or any combination thereof. For example, network 2043b may be a cellular network, a Wi-Fi network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processing circuitry 2001 may be configured to communicate with any of such components over bus 2002. In another example, any of such components may be represented by program instructions stored in memory that when executed by processing circuitry 2001 perform the corresponding functions described herein. In another example, the functionality of any of such components may be partitioned between processing circuitry 2001 and communication subsystem 2031. In another example, the non-computationally intensive functions of any of such components may be implemented in software or firmware and the computationally intensive functions may be implemented in hardware.

Figure 21:
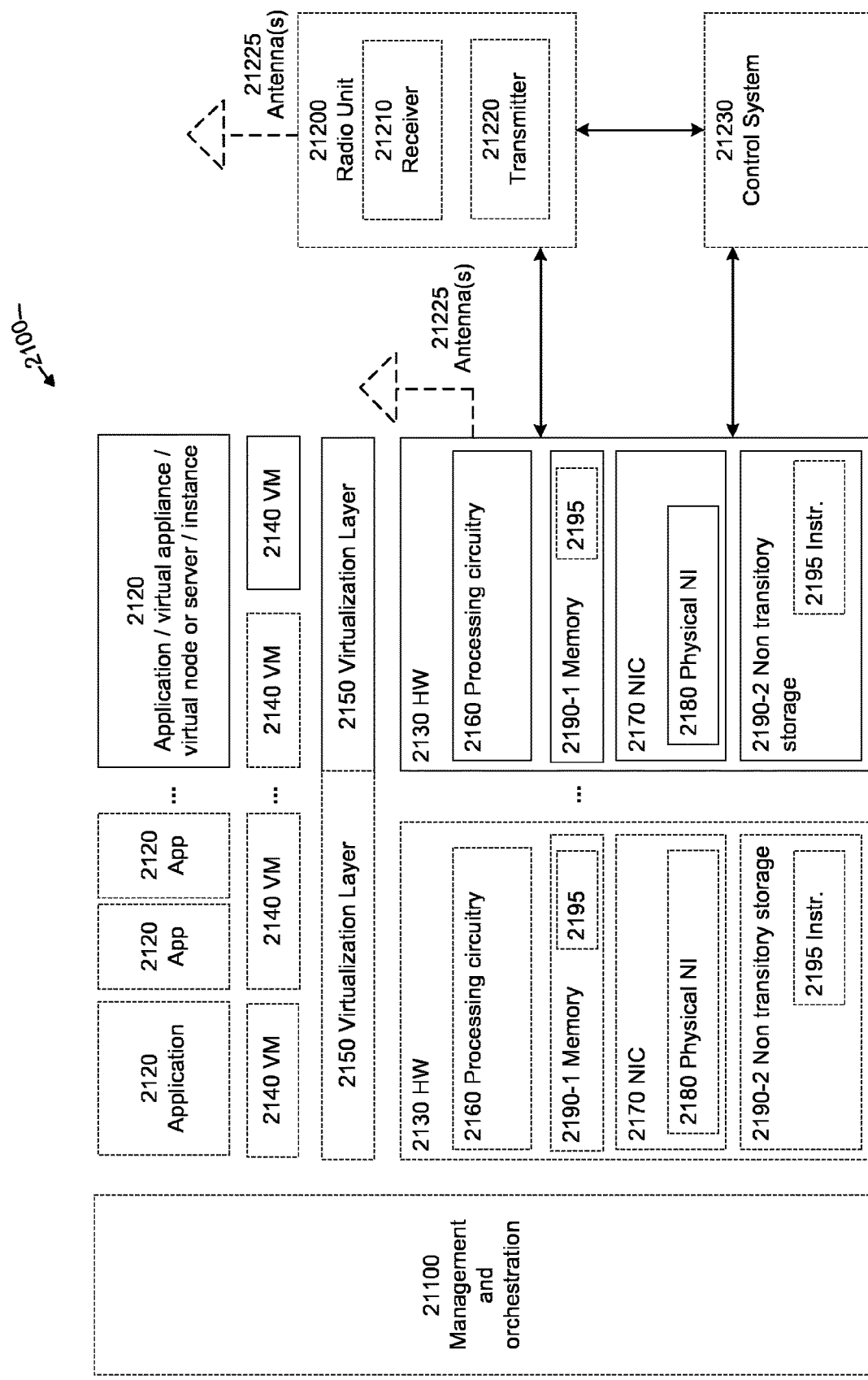
FIG. 21 shows a block diagram of a virtualization environment.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100, comprises general-purpose or special-purpose network hardware devices 2130 comprising a set of one or more processors or processing circuitry 2160, which may be commercial off-the-shelf (COTS) processors, dedicated Application Specific Integrated Circuits (ASICs), or any other type of processing circuitry including digital or analog hardware components or special purpose processors. Each hardware device may comprise memory 2190-1 which may be non-persistent memory for temporarily storing instructions 2195 or software executed by processing circuitry 2160. Each hardware device may comprise one or more network interface controllers (NICs) 2170, also known as network interface cards, which include physical network interface 2180. Each hardware device may also include non-transitory, persistent, machine-readable storage media 2190-2 having stored therein software 2195 and/or instructions executable by processing circuitry 2160. Software 2195 may include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and may be run by a corresponding virtualization layer 2150 or hypervisor. Different embodiments of the instance of virtual appliance 2120 may be implemented on one or more of virtual machines 2140, and the implementations may be made in different ways.

During operation, processing circuitry 2160 executes software 2195 to instantiate the hypervisor or virtualization layer 2150, which may sometimes be referred to as a virtual machine monitor (VMM). Virtualization layer 2150 may present a virtual operating platform that appears like networking hardware to virtual machine 2140.

As shown in FIG. 21, hardware 2130 may be a standalone network node with generic or specific components. Hardware 2130 may comprise antenna 21225 and may implement some functions via virtualization. Alternatively, hardware 2130 may be part of a larger cluster of hardware (e.g. such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2140 may be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 may be coupled to one or more antennas 21225. Radio units 21200 may communicate directly with hardware nodes 2130 via one or more appropriate network interfaces and may be used in combination with the virtual components to provide a virtual node with radio capabilities, such as a radio access node or a base station.

In some embodiments, some signalling can be effected with the use of control system 21230 which may alternatively be used for communication between the hardware nodes 2130 and radio units 21200.

Figure 22:
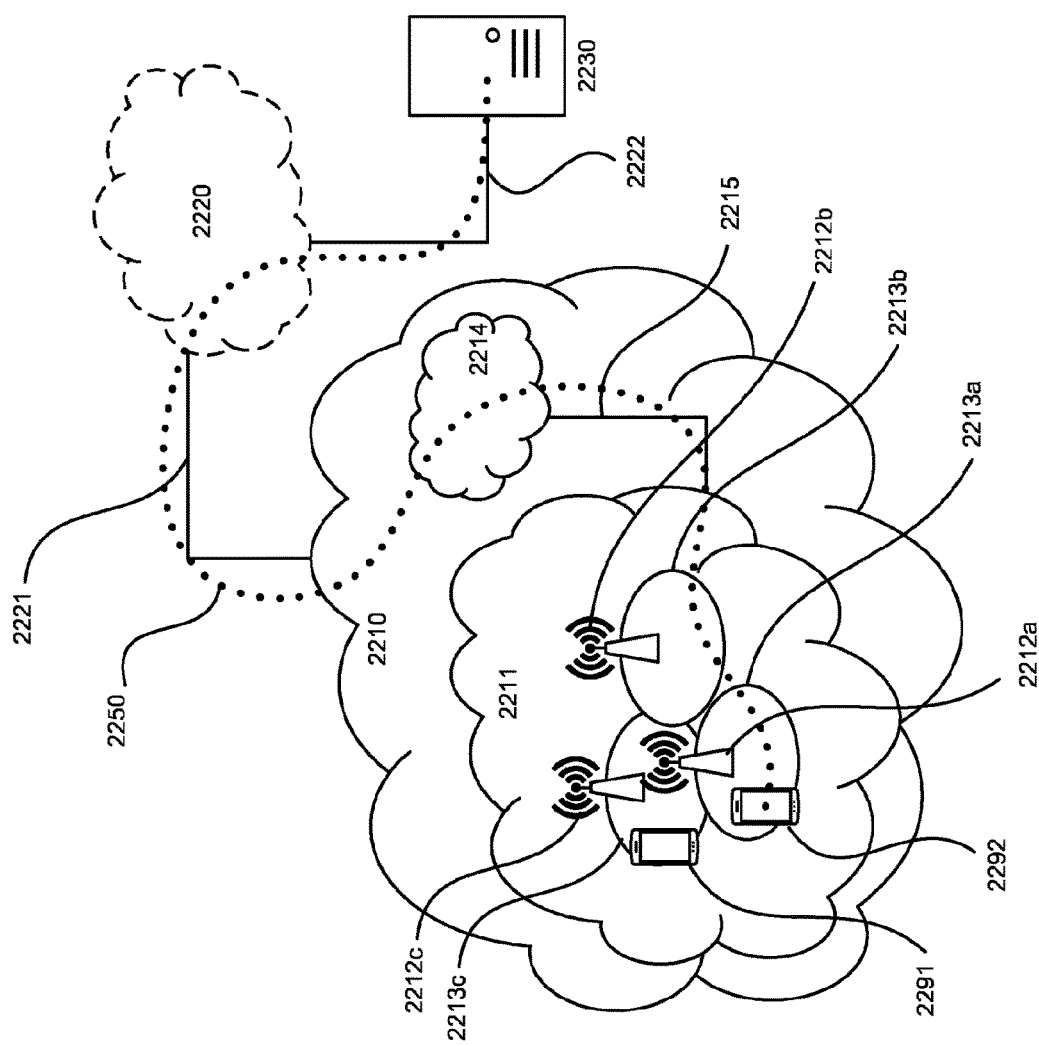
FIG. 22 shows a telecommunication network connected via an intermediate network to a host computer.

FIG. 22 illustrates a telecommunication network connected via an intermediate network to a host computer in accordance with some embodiments. In particular, with reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to core network 2214 over a wired or wireless connection 2215. A first UE 2291 located in coverage area 2213c is configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base station 2212.

Telecommunication network 2210 is itself connected to host computer 2230, which may be embodied in the hardware and/or software of a standalone server, a cloud-implemented server, a distributed server or as processing resources in a server farm. Host computer 2230 may be under the ownership or control of a service provider, or may be operated by the service provider or on behalf of the service provider. Connections 2221 and 2222 between telecommunication network 2210 and host computer 2230 may extend directly from core network 2214 to host computer 2230 or may go via an optional intermediate network 2220. Intermediate network 2220 may be one of, or a combination of more than one of, a public, private or hosted network; intermediate network 2220, if any, may be a backbone network or the Internet; in particular, intermediate network 2220 may comprise two or more sub-networks (not shown).

The communication system of FIG. 22 as a whole enables connectivity between the connected UEs 2291, 2292 and host computer 2230. The connectivity may be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 may be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230.

Figure 23:
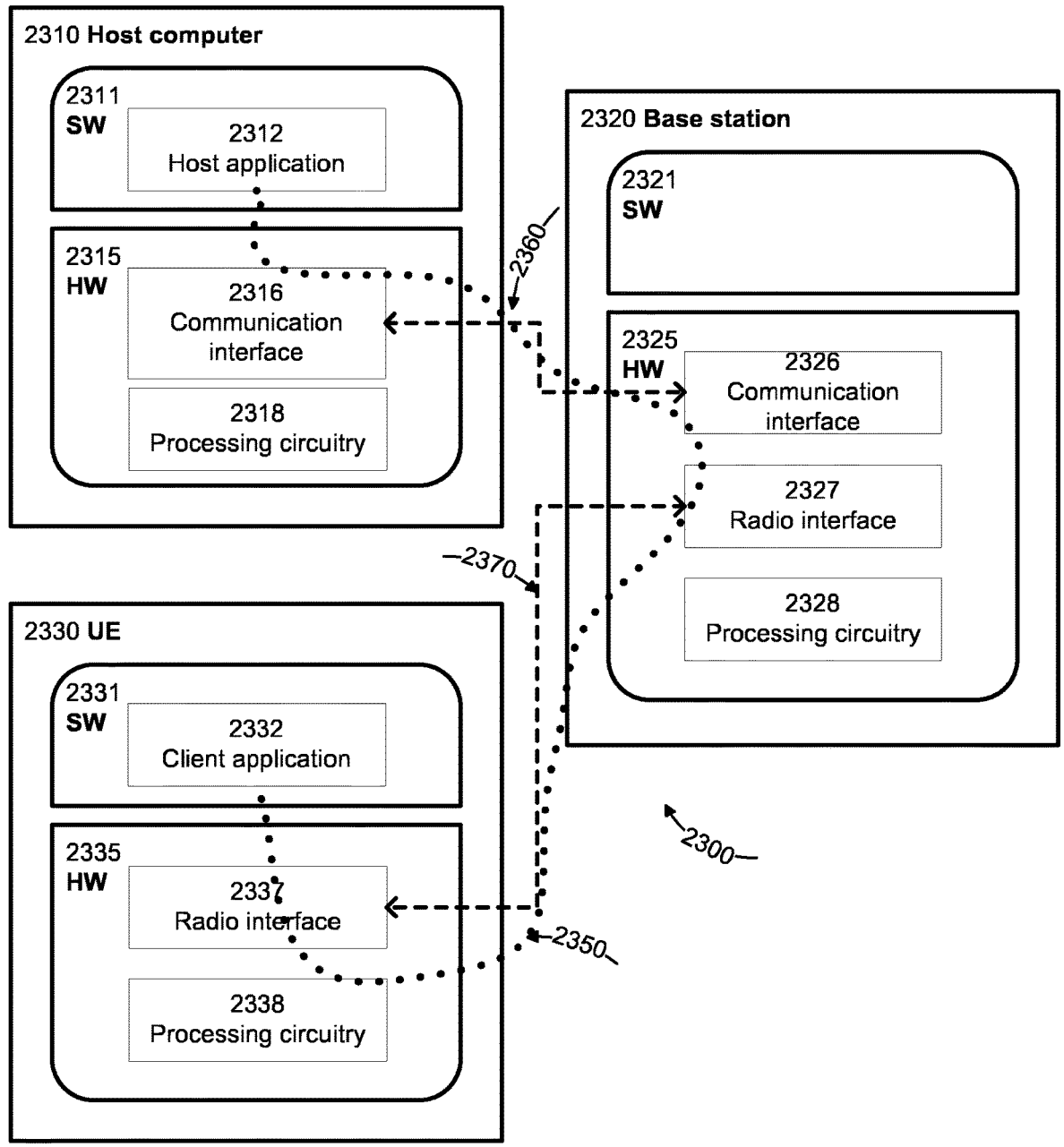
FIG. 23 shows host computer communicating via a base station with a user equipment.

Example implementations, in accordance with an embodiment, of the UE, base station and host computer discussed in the preceding paragraphs will now be described with reference to FIG. 23. FIG. 23 illustrates host computer communicating via a base station with a user equipment over a partially wireless connection in accordance with some embodiments In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which may have storage and/or processing capabilities. In particular, processing circuitry 2318 may comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 may be operable to provide a service to a remote user, such as UE 2330 connecting via OTT connection 2350 terminating at UE 2330 and host computer 2310. In providing the service to the remote user, host application 2312 may provide user data which is transmitted using OTT connection 2350.

Communication system 2300 further includes base station 2320 provided in a telecommunication system and comprising hardware 2325 enabling it to communicate with host computer 2310 and with UE 2330. Hardware 2325 may include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 may be configured to facilitate connection 2360 to host computer 2310. Connection 2360 may be direct or it may pass through a core network (not shown in FIG. 23) of the telecommunication system and/or through one or more intermediate networks outside the telecommunication system. In the embodiment shown, hardware 2325 of base station 2320 further includes processing circuitry 2328, which may comprise one or more programmable processors, application-specific integrated circuits, field programmable gate arrays or combinations of these (not shown) adapted to execute instructions. Base station 2320 further has software 2321 stored internally or accessible via an external connection.

Communication system 2300 further includes UE 2330 already referred to. Its hardware 2335 may include radio interface 2337 configured to set up and maintain wireless connection 2370 with a base station serving a coverage area in which UE 2330 is currently located. Hardware 2335 of UE 2330 further includes processing circuitry 2338, which may comprise one or more programmable processors, application-specific integrated circuits, field programmable gate arrays or combinations of these (not shown) adapted to execute instructions. UE 2330 further comprises software 2331, which is stored in or accessible by UE 2330 and executable by processing circuitry 2338. Software 2331 includes client application 2332. Client application 2332 may be operable to provide a service to a human or non-human user via UE 2330, with the support of host computer 2310. In host computer 2310, an executing host application 2312 may communicate with the executing client application 2332 via OTT connection 2350 terminating at UE 2330 and host computer 2310. In providing the service to the user, client application 2332 may receive request data from host application 2312 and provide user data in response to the request data. OTT connection 2350 may transfer both the request data and the user data. Client application 2332 may interact with the user to generate the user data that it provides.

It is noted that host computer 2310, base station 2320 and UE 2330 illustrated in FIG. 23 may be similar or identical to host computer 2230, one of base stations 2212*a*, 2212*b*, 2212*c* and one of UEs 2291, 2292 of FIG. 22, respectively. This is to say, the inner workings of these entities may be as shown in FIG. 23 and independently, the surrounding network topology may be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure may determine the routing, which it may be configured to hide from UE 2330 or from the service provider operating host computer 2310, or both. While OTT connection 2350 is active, the network infrastructure may further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the teachings of these embodiments provide solutions for the better coexistence of allowing an NB-IoT carrier to be embedded inside a 5G NR carrier with 30 kHz subcarrier spacing. This reduces interference and increases resource efficiency, which provide benefits such as a better user communication experience and better battery life.

A measurement procedure may be provided for the purpose of monitoring data rate, latency and other factors on which the one or more embodiments improve. There may further be an optional network functionality for reconfiguring OTT connection 2350 between host computer 2310 and UE 2330, in response to variations in the measurement results. The measurement procedure and/or the network functionality for reconfiguring OTT connection 2350 may be implemented in software 2311 and hardware 2315 of host computer 2310 or in software 2331 and hardware 2335 of UE 2330, or both. In embodiments, sensors (not shown) may be deployed in or in association with communication devices through which OTT connection 2350 passes; the sensors may participate in the measurement procedure by supplying values of the monitored quantities exemplified above, or supplying values of other physical quantities from which software 2311, 2331 may compute or estimate the monitored quantities. The reconfiguring of OTT connection 2350 may include message format, retransmission settings, preferred routing etc.; the reconfiguring need not affect base station 2320, and it may be unknown or imperceptible to base station 2320. Such procedures and functionalities may be known and practiced in the art. In certain embodiments, measurements may involve proprietary UE signaling facilitating host computer 2310's measurements of throughput, propagation times, latency and the like. The measurements may be implemented in that software 2311 and 2331 causes messages to be transmitted, in particular empty or 'dummy' messages, using OTT connection 2350 while it monitors propagation times, errors etc.

Figure 24:
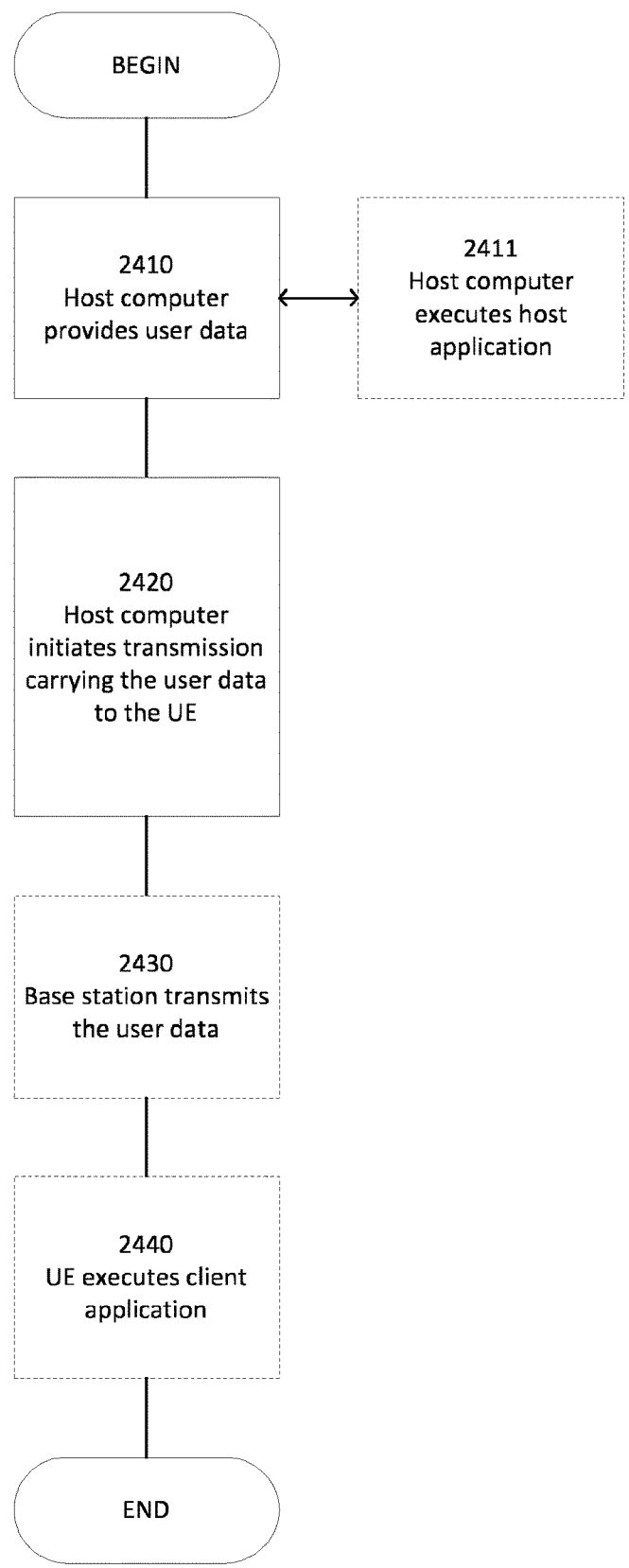
FIG. 24 shows a flowchart in accordance with one embodiment.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

Figure 25:
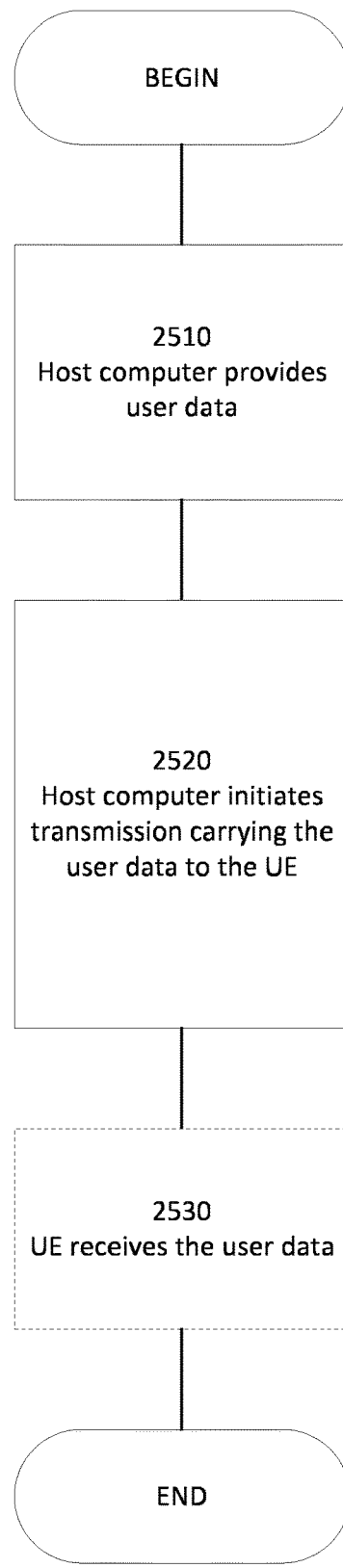
FIG. 25 shows a flowchart in accordance with another embodiment.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

Figure 26:
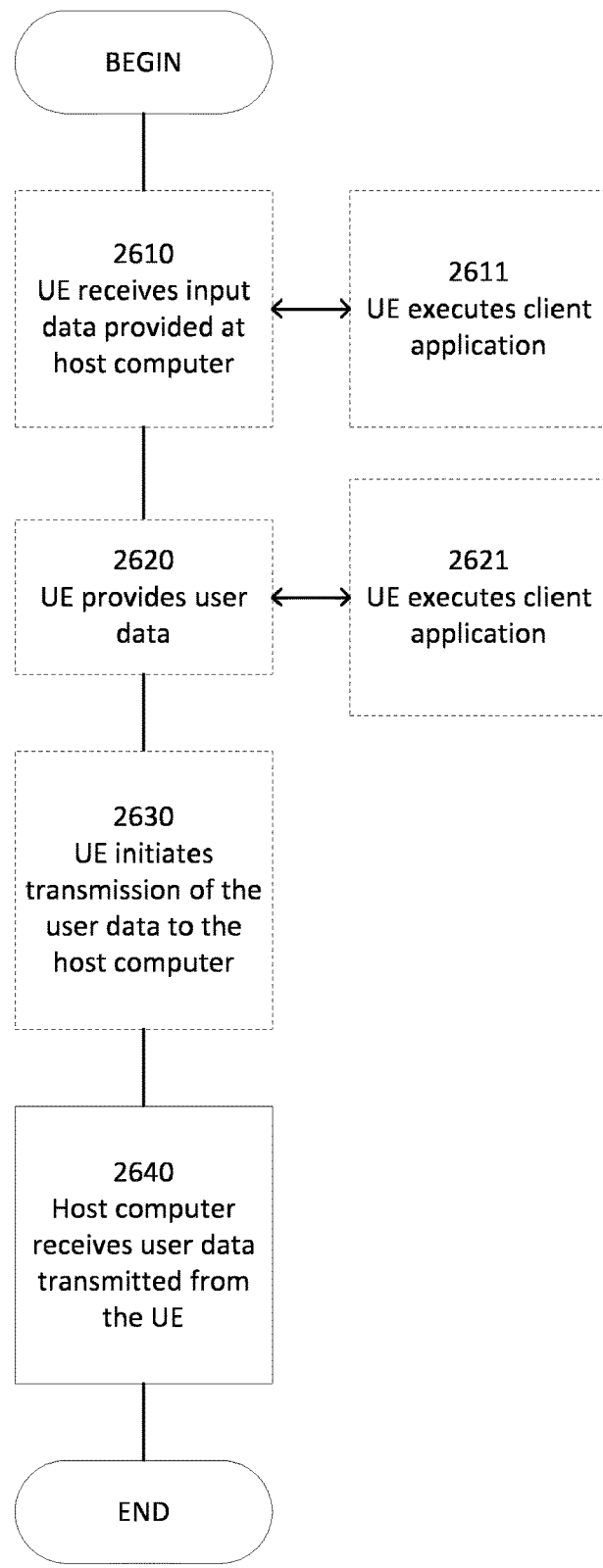
FIG. 26 shows a flowchart in accordance with another embodiment.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 2610 (which may be optional), the UE receives input data provided by the host computer. Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure.

Figure 27:
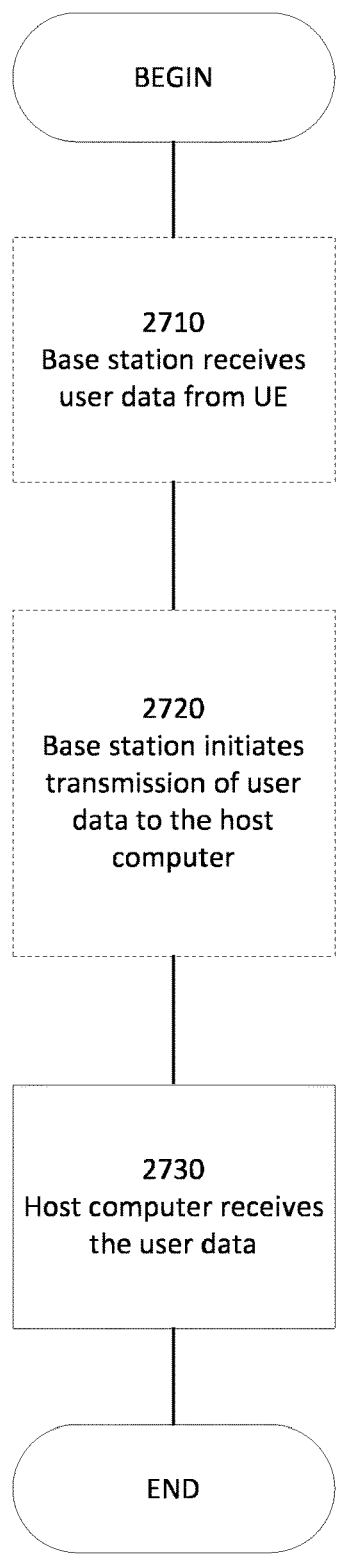
FIG. 27 shows a flowchart in accordance with another embodiment.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for communicating in a wireless communication network, the method comprising:
transmitting or receiving a signal on a Narrowband Internet-of-Things (NB-IoT), carrier that is within a bandwidth of a New Radio (NR) carrier, the NB-IoT carrier has a frequency center whose position satisfies a requirement on that position relative to a channel raster, and the NB-IoT carrier has two or more subcarriers which each align in frequency with a respective subcarrier of the NR carrier, wherein frequency range occupied by the NB-IoT carrier overlaps with frequency range occupied by the NR carrier.

2. The method of claim 1, wherein at least one-half of the subcarriers of the NB-IoT carrier each align in frequency with a respective subcarrier of the NR carrier.

3. The method of claim 1, wherein every other one of the subcarriers of the NB-IoT carrier aligns in frequency with a respective subcarrier of the NR carrier.

4. The method of claim 1, wherein the requirement on the position of the frequency center of the NB-IoT carrier requires that the position of the frequency center of the NB-IoT carrier be offset from the channel raster by +/−2.5 kHz or +/−7.5 kHz.

5. The method of claim 4, wherein the position of the frequency center of the NB-IoT carrier is either:
a position offset by +22.5 kHz from a subcarrier of the NR carrier with a subcarrier index k* defined by $$k^* = \frac{20r-3}{6}, \frac{20r-4}{6}, \frac{20r-5}{6}, \text{ or } \frac{20r-6}{6},$$

for any integer r that produces a subcarrier index k* within the bandwidth of the NR carrier; and
a position offset by +7.5 kHz from a subcarrier of the NR carrier with a subcarrier index k* defined by $$k^* = \frac{20r}{6}, \frac{20r-1}{6}, \frac{20r-2}{6}, \text{ or } \frac{20r-3}{6},$$

for any integer r that produces a subcarrier index k* within the bandwidth of the NR carrier, wherein the subcarrier index k* is an index of a subcarrier of the NR carrier relative to the channel raster.

6. The method of claim 4, wherein the NR carrier has a subcarrier spacing of 30 kHz, and wherein the position of the frequency center of the NB-ioT carrier is either:
- if the bandwidth of the NR carrier is equal to 10 MHz, a position offset by +22.5 kHz from a subcarrier of the NR carrier with a subcarrier index k* of −144, −134, . . . , −14, −4, 6, 16, . . . , or 136, or a position offset by +7.5 kHz from a subcarrier of the NR carrier with a subcarrier index k* of −140, −130, . . . , −10, 0, 10, . . . , 130, or 140;
- if the bandwidth of the NR carrier is equal to 15 MHz, a position offset by +22.5 kHz from a subcarrier of the NR carrier with a subcarrier index k* of −224, −214, . . . , −14, −4, 6, 16, . . . , or 226, or a position offset by +7.5 kHz from a subcarrier of the NR carrier with a subcarrier index k* of −220, −210, . . . , −10, 0, 10, . . . , 210, or 220;
- if the bandwidth of the NR carrier is equal to 20 MHz, a position offset by +22.5 kHz from a subcarrier of the NR carrier with a subcarrier index k* of −304, −294, . . . , −14, −4, 6, 16, . . . , or 296, or a position offset by +7.5 kHz from a subcarrier of the NR carrier with a subcarrier index k* of −300, −290 . . . , −10, 0, 10, . . . , 290, or 300;
- if the bandwidth of the NR carrier is equal to 25 MHz, a position offset by +22.5 kHz from a subcarrier of the NR carrier with a subcarrier index k* of −384, −374, . . . , −14, −4, 6, 16, . . . , or 386, or a position offset by +7.5 kHz from a subcarrier of the NR carrier with a subcarrier index k* of −390, −380, . . . , −10, 0, 10, . . . , 370, or 380; or
- if the bandwidth of the NR carrier is equal to 30 MHz, a position offset by +22.5 kHz from a subcarrier of the NR carrier with a subcarrier index k* of −464, −454, . . . , −14, −4, 6, 16, . . . , or 466, or a position offset by +7.5 kHz from a subcarrier of the NR carrier with a subcarrier index k* of −460, −450, . . . , −10, 0, 10, . . . , 450, or 460, wherein the subcarrier index k* is an index of a subcarrier of the NR carrier relative to the channel raster.

7. The method of claim 4, wherein the NR carrier has a subcarrier spacing of 30 kHz, and wherein the position of the frequency center of the NB-IoT carrier is either:
- if the bandwidth of the NR carrier is equal to 10 MHz, a position offset by +22.5 kHz from a subcarrier of the NR carrier with a subcarrier index k* of −114, −104, −94, −54, −44, −34, 6, 16, 26, 66, 76, 86, 126, or 136, or a position offset by +7.5 kHz from a subcarrier of the NR carrier with a subcarrier index k* of −140, −100, −90, −80, −40, −30, −20, 20, 30, 40, 80, 90, 100, or 140;
- if the bandwidth of the NR carrier is equal to 15 MHz, a position offset by +22.5 kHz from a subcarrier of the NR carrier with a subcarrier index k* of −224, −214, −174, −164, −154, −114, −104, −94, −54, −44, −34, 6, 16, 26, 66, 76, 86, 126, 136, 146, 186, 196, or 206, or a position offset by +7.5 kHz from a subcarrier of the NR carrier with a subcarrier index k* of −220, −210, −200, −160, −150, −140, −100, −90, −80, −40, −30, −20, 20, 30, 40, 80, 90, 100, 140, 150, 160, 200, 210, or 220;
- if the bandwidth of the NR carrier is equal to 20 MHz, a position offset by +22.5 kHz from a subcarrier of the NR carrier with a subcarrier index k* of −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, or 296, or a position offset by +7.5 kHz from a subcarrier of the NR carrier with a subcarrier index k* of −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, or 300;
- if the bandwidth of the NR carrier is equal to 25 MHz, a position offset by +22.5 kHz from a subcarrier of the NR carrier with a subcarrier index k* of −384, −374, −364, −324, −314, −304, −264, −254, −244, −204, −194, −184, −144, −134, −124, −84, −74, −64, −24, −14, −4, 36, 46, 56, 96, 106, 116, 156, 166, 176, 216, 226, 236, 276, 286, 296, 336, 346, or 356, or a position offset by +7.5 kHz from a subcarrier of the NR carrier with a subcarrier index k* of −370, −360, −350, −310, −300, −290, −250, −240, −230, −190, −180, −170, −130, −120, −110, −70, −60, −50, −10, 0, 10, 50, 60, 70, 110, 120, 130, 170, 180, 190, 230, 240, 250, 290, 300, 310, 350, 360, or 370; or
- if the bandwidth of the NR carrier is equal to 30 MHz, a position offset by +22.5 kHz from a subcarrier of the NR carrier with a subcarrier index k* of −464, −454, −414, −404, −394, −354, −344, −334, −294, −284, −274, −234, −224, −214, −174, −164, −154, −114, −104, −94, −54, −44, −34, 6, 16, 26, 66, 76, 86, 126, 136, 146, 186, 196, 206, 246, 256, 266, 306, 316, 326, 366, 376, 386, 426, 436, or 446, or a position offset by +7.5 kHz from a subcarrier of the NR carrier with a subcarrier index k* of −460, −450, −440, −400, −390, −380, −340, −330, −320, −280, −270, −260, −220, −210, −200, −160, −150, −140, −100, −90, −80, −40, −30, −20, 20, 30, 40, 80, 90, 100, 140, 150, 160, 200, 210, 220, 260, 270, 280, 320, 330, 340, 380, 390, 400, 440, 450, or 460;

wherein the subcarrier index k* is an index of a subcarrier of the NR carrier relative to the channel raster.

8. The method of claim 4, wherein the NR carrier has a subcarrier spacing of 30 kHz, and wherein the position of the frequency center of the NB-IoT carrier is either:
- if the bandwidth of the NR carrier is equal to 10 MHz, a position offset by +22.5 kHz from a subcarrier of the NR carrier with a subcarrier index k* of −104, −44, 16, 76, or 136, or a position offset by +7.5 kHz from a subcarrier of the NR carrier with a subcarrier index k* of −90, −30, 30, or 90;
- if the bandwidth of the NR carrier is equal to 15 MHz, a position offset by +22.5 kHz from a subcarrier of the NR carrier with a subcarrier index k* of −224, −164, −104, −44, 16, 76, 136, or 196, or a position offset by +7.5 kHz from a subcarrier of the NR carrier with a subcarrier index k* of −210, −150, −90, −30, 30, 90, 150, or 210;
- if the bandwidth of the NR carrier is equal to 20 MHz, a position offset by +22.5 kHz from a subcarrier of the NR carrier with a subcarrier index k* of −254, −194, −134, −74, −14, 46, 106, 166, 226, or 286, or a position offset by +7.5 kHz from a subcarrier of the NR carrier with a subcarrier index k* of −300, −240, −180, −120, −60, −50, 0, 60, 120, 180, 240, or 300;
- if the bandwidth of the NR carrier is equal to 25 MHz, a position offset by +22.5 kHz from a subcarrier of the NR carrier with a subcarrier index k* of −374, −314, −254, −194, −134, −74, −14, 46, 106, 166, 226, 286, or 346, or a position offset by +7.5 kHz from a subcarrier of the NR carrier with a subcarrier index k* of −360, −300, −240, −180, −120, −60, 0, 60, 120, 180, 240, 300, or 360; or if the bandwidth of the NR carrier is equal to 30 MHz, a position offset by +22.5 kHz from a subcarrier of the NR carrier with a subcarrier index k* of −464, −404, −344, −284, −224, −164, −104, −44, 16, 76, 136, 196, 256, 316, 376, or 436, or a position offset by +7.5 kHz from a subcarrier of the NR carrier with a subcarrier index k* of −450, −390, −330, −270, −210, −150, −90, −30, 30, 90, 150, 210, 270, 330, 390, or 450, wherein the subcarrier index k* is an index of a subcarrier of the NR carrier relative to the channel raster.

9. The method of claim 1, wherein a bandwidth of the NB-IoT carrier overlaps only a single NR resource block.

10. The method of claim 1, wherein the NB-IoT carrier has a guard band of at least 67.5 kHz on each side of the NB-IoT carrier within a single NR resource block.

11. The method of claim 1, further comprising: generating the signal and wherein said transmitting or receiving comprises transmitting the generated signal on the NB-IoT carrier.

12. The method of claim 1, wherein said transmitting or receiving comprises receiving the signal on the NB-IoT carrier, and wherein the method further comprises processing the received signal.

13. A wireless device for communicating in a wireless communication network, the wireless device, the wireless device comprising:
communication circuitry; and
processing circuitry configured to transmit or receive a signal on a Narrowband Internet-of-Things (NB-IoT) carrier that is within a bandwidth of a New Radio (NR) carrier, the NB-IoT carrier has a frequency center whose position satisfies a requirement on that position relative to a channel raster, and the NB-IoT carrier has two or more subcarriers which each align in frequency with a respective subcarrier of the NR carrier, wherein frequency range occupied by the NB-IoT carrier overlaps with frequency range occupied by the NR carrier.

14. The wireless device of claim 13, wherein at least one-half of the subcarriers of the NB-IoT carrier each align in frequency with a respective subcarrier of the NR carrier.

15. The wireless device of claim 13, wherein every other one of the subcarriers of the NB-IoT carrier aligns in frequency with a respective subcarrier of the NR carrier.

16. The wireless device of claim 13, wherein the requirement on the position of the frequency center of the NB-IoT carrier requires that the position of the frequency center of the NB-IoT carrier be offset from the channel raster by +/−2.5 kHz or +/−7.5 kHz.

17. A computer program comprising instructions which, when executed by at least one processor of a wireless device, causes the wireless device to:
transmit or receive a signal on a Narrowband Internet-of-Things (NB-IoT) carrier that is within a bandwidth of a New Radio (NR) carrier, the NB-IoT carrier has a frequency center whose position satisfies a requirement on that position relative to a channel raster, and the NB-IoT carrier has two or more subcarriers which each align in frequency with a respective subcarrier of the NR carrier, wherein frequency range occupied by the NB-IoT carrier overlaps with frequency range occupied by the NR carrier.

18. A radio network node for communicating in a wireless communication network, the radio network node comprising:
communication circuitry; and
processing circuitry configured to transmit or receive a signal on a Narrowband internet-of-Things (NB-IoT) carrier that is within a bandwidth of a New Radio (NR) carrier, the NB-IoT carrier has a frequency center whose position satisfies a requirement on that position relative to a channel raster, and the NB-IoT carrier has two or more subcarriers which each align in frequency with a respective subcarrier of the NR carrier, wherein frequency range occupied by the NB-IoT carrier overlaps with frequency range occupied by the NR carrier.

19. A computer program comprising instructions which, when executed by at least one processor of a radio network node, causes the radio network node to:
transmit or receive a signal on a Narrowband Internet-of-Things (NB-IoT) carrier that is within a bandwidth of a New Radio (NR) carrier, the NB-IoT carrier has a frequency center whose position satisfies a requirement on that position relative to a channel raster, and the NB-IoT carrier has two or more subcarriers which each align in frequency with a respective subcarrier of the NR carrier, wherein frequency range occupied by the NB-IoT carrier overlaps with frequency range occupied by the NR carrier.

* * * * *